United States Patent
Orme et al.

(10) Patent No.: US 12,217,347 B2
(45) Date of Patent: Feb. 4, 2025

(54) INTERACTIVE AVATARS IN ARTIFICIAL REALITY

(71) Applicant: Meta Platforms Technologies, LLC, Menlo Park, CA (US)

(72) Inventors: Campbell Orme, London (GB); Matthew Adam Hanson, River Vale, NJ (US); Daphne Liang, Mercer Island, WA (US); Matthew Roberts, Menlo Park, CA (US); Fangwei Lee, San Carlos, CA (US); Bryant Jun-Yao Tang, Foster City, CA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 0 days.

(21) Appl. No.: 18/517,544

(22) Filed: Nov. 22, 2023

(65) Prior Publication Data
US 2024/0087201 A1 Mar. 14, 2024

Related U.S. Application Data

(63) Continuation of application No. 17/677,411, filed on Feb. 22, 2022, now Pat. No. 11,893,674, which is a
(Continued)

(51) Int. Cl.
G06T 19/20 (2011.01)
G06T 13/40 (2011.01)
G06T 19/00 (2011.01)

(52) U.S. Cl.
CPC ............ *G06T 13/40* (2013.01); *G06T 19/006* (2013.01); *G06T 19/20* (2013.01); *G06T 2213/12* (2013.01)

(58) Field of Classification Search
None
See application file for complete search history.

(56) References Cited

U.S. PATENT DOCUMENTS 6,072,467 A 6/2000 Walker
6,556,196 B1 4/2003 Blanz et al.
(Continued)

FOREIGN PATENT DOCUMENTS

CN 107330969 A 11/2017
CN 113050795 A 6/2021
(Continued)

OTHER PUBLICATIONS

Chen Y., et al., "Object Modeling by Registration of Multiple Range Images," Proceedings of the 1991 IEEE International Conference on Robotics and Automation, Apr. 1991, pp. 2724-2729, Retrieved from the internet: URL: https://graphics.stanford.edu/courses/cs348a-17-winter/Handouts/chen-medioni-align-rob91.pdf.
(Continued)

*Primary Examiner* — Robert J Craddock
(74) *Attorney, Agent, or Firm* — Potomac Law Group, PLLC; Dannon G. Allbee

(57) ABSTRACT

Aspects of the present disclosure are directed to creating interactive avatars that can be pinned as world-locked artificial reality content. Once pinned, an avatar can interact with the environment according to contextual queues and rules, without active control by the avatar owner. An interactive avatar system can configure the avatar with action rules, visual elements, and settings based on user selections. Once an avatar is configured and pinned to a location by an avatar owner, when other XR devices are at that location, a central system can provide the avatar (with its configurations) to the other XR device. This allows a user of that other XR device to discover and interact with the avatar according to the configurations established by the avatar owner.

20 Claims, 12 Drawing Sheets

Related U.S. Application Data continuation of application No. 17/360,888, filed on Jun. 28, 2021, now Pat. No. 11,295,503.

(56) References Cited

U.S. PATENT DOCUMENTS

| | | |
|---|---|---|
| 6,842,175 B1 | 1/2005 | Schmalstieg et al. |
| 7,701,439 B2 | 4/2010 | Hillis et al. |
| 8,026,918 B1 | 9/2011 | Murphy |
| D683,749 S | 6/2013 | Hally |
| D689,874 S | 9/2013 | Brinda et al. |
| 8,947,351 B1 | 2/2015 | Noble |
| D726,219 S | 4/2015 | Chaudhri et al. |
| D727,352 S | 4/2015 | Ray et al. |
| D727,354 S | 4/2015 | Park et al. |
| D733,740 S | 7/2015 | Lee et al. |
| 9,117,274 B2 | 8/2015 | Liao et al. |
| 9,292,089 B1 | 3/2016 | Sadek |
| D761,273 S | 7/2016 | Kim et al. |
| D763,279 S | 8/2016 | Jou |
| 9,477,368 B1 | 10/2016 | Filip et al. |
| D775,179 S | 12/2016 | Kimura et al. |
| D775,196 S | 12/2016 | Huang et al. |
| 9,530,252 B2 | 12/2016 | Poulos et al. |
| D780,794 S | 3/2017 | Kisielius et al. |
| D781,905 S | 3/2017 | Nakaguchi et al. |
| D783,037 S | 4/2017 | Hariharan et al. |
| D784,394 S | 4/2017 | Laing et al. |
| D784,395 S | 4/2017 | Laing et al. |
| D787,527 S | 5/2017 | Wilberding |
| D788,136 S | 5/2017 | Jaini et al. |
| D788,793 S | 6/2017 | Ogundokun et al. |
| D789,416 S | 6/2017 | Baluja et al. |
| D789,977 S | 6/2017 | Mijatovic et al. |
| D790,567 S | 6/2017 | Su et al. |
| D791,823 S | 7/2017 | Zhou |
| D793,403 S | 8/2017 | Cross et al. |
| 9,770,203 B1 | 9/2017 | Berme et al. |
| 9,817,472 B2 | 11/2017 | Lee et al. |
| D817,994 S | 5/2018 | Jou |
| D819,065 S | 5/2018 | Xie et al. |
| D824,951 S | 8/2018 | Kolbrener et al. |
| D828,381 S | 9/2018 | Lee et al. |
| D829,231 S | 9/2018 | Hess et al. |
| D831,681 S | 10/2018 | Eilertsen |
| D835,665 S | 12/2018 | Kimura et al. |
| 10,168,768 B1 | 1/2019 | Kinstner |
| D842,889 S | 3/2019 | Krainer et al. |
| 10,220,303 B1 | 3/2019 | Schmidt et al. |
| 10,248,284 B2 | 4/2019 | Itani et al. |
| D848,474 S | 5/2019 | Baumez et al. |
| D850,468 S | 6/2019 | Malahy et al. |
| D851,123 S | 6/2019 | Turner |
| D853,431 S | 7/2019 | Sagrillo et al. |
| D854,551 S | 7/2019 | Pistiner et al. |
| D856,366 S | 8/2019 | Richardson |
| D859,426 S | 9/2019 | Poes |
| 10,473,935 B1 | 11/2019 | Gribetz et al. |
| 10,521,944 B2 | 12/2019 | Sareen et al. |
| 10,665,019 B2 | 5/2020 | Hildreth et al. |
| D888,071 S | 6/2020 | Wilberding |
| D900,123 S | 10/2020 | Lopes |
| 10,839,481 B1 | 11/2020 | Chen |
| D908,713 S | 1/2021 | Fremine et al. |
| D910,655 S | 2/2021 | Matthewman et al. |
| D910,660 S | 2/2021 | Chaturvedi et al. |
| 10,916,220 B2 | 2/2021 | Ngo |
| 10,976,804 B1 | 4/2021 | Atlas et al. |
| 10,987,573 B2 | 4/2021 | Nietfeld et al. |
| 10,990,240 B1 | 4/2021 | Ravasz et al. |
| 11,086,476 B2 | 8/2021 | Inch et al. |
| 11,217,036 B1 | 1/2022 | Albuz et al. |
| 11,295,503 B1 | 4/2022 | Orme et al. |
| 11,475,639 B2 | 10/2022 | Booth et al. |
| 11,861,757 B2 | 1/2024 | Booth et al. |
| 11,893,674 B2 | 2/2024 | Orme et al. |
| 2004/0266506 A1 | 12/2004 | Herbrich et al. |
| 2005/0162419 A1 | 7/2005 | Kim et al. |
| 2008/0089587 A1 | 4/2008 | Kim et al. |
| 2008/0215994 A1 | 9/2008 | Harrison et al. |
| 2009/0044113 A1 | 2/2009 | Jones et al. |
| 2009/0251471 A1 | 10/2009 | Bokor et al. |
| 2009/0265642 A1 | 10/2009 | Carter et al. |
| 2010/0306716 A1 | 12/2010 | Perez |
| 2011/0148916 A1 | 6/2011 | Blattner |
| 2011/0267265 A1 | 11/2011 | Stinson |
| 2011/0302535 A1 | 12/2011 | Clerc et al. |
| 2012/0069168 A1 | 3/2012 | Huang et al. |
| 2012/0105473 A1 | 5/2012 | Bar-Zeev et al. |
| 2012/0113223 A1 | 5/2012 | Hilliges et al. |
| 2012/0117514 A1 | 5/2012 | Kim et al. |
| 2012/0143358 A1 | 6/2012 | Adams et al. |
| 2012/0206345 A1 | 8/2012 | Langridge |
| 2012/0275686 A1 | 11/2012 | Wilson et al. |
| 2012/0293544 A1 | 11/2012 | Miyamoto et al. |
| 2013/0038601 A1 | 2/2013 | Han et al. |
| 2013/0063345 A1 | 3/2013 | Maeda |
| 2013/0125066 A1 | 5/2013 | Klein et al. |
| 2013/0147793 A1 | 6/2013 | Jeon et al. |
| 2013/0265220 A1 | 10/2013 | Fleischmann et al. |
| 2014/0078176 A1 | 3/2014 | Kim et al. |
| 2014/0125598 A1 | 5/2014 | Cheng et al. |
| 2014/0191946 A1 | 7/2014 | Cho et al. |
| 2014/0236996 A1 | 8/2014 | Masuko et al. |
| 2015/0035746 A1 | 2/2015 | Cockburn et al. |
| 2015/0054742 A1 | 2/2015 | Imoto et al. |
| 2015/0062160 A1 | 3/2015 | Sakamoto et al. |
| 2015/0123967 A1 | 5/2015 | Quinn et al. |
| 2015/0138099 A1 | 5/2015 | Major |
| 2015/0153833 A1 | 6/2015 | Pinault et al. |
| 2015/0160736 A1 | 6/2015 | Fujiwara |
| 2015/0169076 A1 | 6/2015 | Cohen et al. |
| 2015/0181679 A1 | 6/2015 | Liao et al. |
| 2015/0206321 A1 | 7/2015 | Scavezze et al. |
| 2015/0220150 A1 | 8/2015 | Plagemann et al. |
| 2015/0261659 A1 | 9/2015 | Bader et al. |
| 2015/0293666 A1 | 10/2015 | Lee et al. |
| 2015/0358614 A1 | 12/2015 | Jin |
| 2015/0371441 A1 | 12/2015 | Shim |
| 2016/0035133 A1 | 2/2016 | Ye et al. |
| 2016/0062618 A1 | 3/2016 | Fagan et al. |
| 2016/0110052 A1 | 4/2016 | Kim et al. |
| 2016/0147308 A1 | 5/2016 | Gelman et al. |
| 2016/0170603 A1 | 6/2016 | Bastien et al. |
| 2016/0178936 A1 | 6/2016 | Yang et al. |
| 2016/0314341 A1 | 10/2016 | Maranzana et al. |
| 2016/0378291 A1 | 12/2016 | Pokrzywka |
| 2017/0031503 A1 | 2/2017 | Rosenberg et al. |
| 2017/0060230 A1 | 3/2017 | Faaborg et al. |
| 2017/0061696 A1 | 3/2017 | Li et al. |
| 2017/0109936 A1 | 4/2017 | Powderly et al. |
| 2017/0139478 A1 | 5/2017 | Jeon et al. |
| 2017/0192513 A1 | 7/2017 | Karmon et al. |
| 2017/0236320 A1 | 8/2017 | Gribetz et al. |
| 2017/0237789 A1 | 8/2017 | Harner et al. |
| 2017/0262063 A1 | 9/2017 | Blénessy et al. |
| 2017/0270715 A1 | 9/2017 | Lindsay et al. |
| 2017/0278304 A1 | 9/2017 | Hildreth et al. |
| 2017/0287225 A1 | 10/2017 | Powderly et al. |
| 2017/0296363 A1 | 10/2017 | Yetkin et al. |
| 2017/0316606 A1 | 11/2017 | Khalid et al. |
| 2017/0336951 A1 | 11/2017 | Palmaro |
| 2017/0364198 A1 | 12/2017 | Yoganandan et al. |
| 2018/0017815 A1 | 1/2018 | Chumbley et al. |
| 2018/0059901 A1 | 3/2018 | Gullicksen |
| 2018/0082454 A1 | 3/2018 | Sahu et al. |
| 2018/0096537 A1 | 4/2018 | Kornilov et al. |
| 2018/0107278 A1 | 4/2018 | Goel et al. |
| 2018/0113599 A1 | 4/2018 | Yin |
| 2018/0144556 A1 | 5/2018 | Champion et al. |
| 2018/0150993 A1 | 5/2018 | Newell et al. |
| 2018/0307303 A1 | 10/2018 | Powderly et al. |
| 2018/0322701 A1 | 11/2018 | Pahud et al. |
| 2018/0335925 A1 | 11/2018 | Hsiao et al. |
| 2018/0349690 A1 | 12/2018 | Rhee et al. |

(56) References Cited

U.S. PATENT DOCUMENTS

| | | |
|---|---|---|
| 2019/0050427 A1 | 2/2019 | Wiesel et al. |
| 2019/0065027 A1 | 2/2019 | Hauenstein et al. |
| 2019/0094981 A1 | 3/2019 | Bradski et al. |
| 2019/0102044 A1 | 4/2019 | Wang et al. |
| 2019/0107894 A1 | 4/2019 | Hebbalaguppe et al. |
| 2019/0130172 A1 | 5/2019 | Zhong et al. |
| 2019/0213792 A1 | 7/2019 | Jakubzak et al. |
| 2019/0258318 A1 | 8/2019 | Qin et al. |
| 2019/0278376 A1 | 9/2019 | Kutliroff et al. |
| 2019/0279424 A1 | 9/2019 | Clausen et al. |
| 2019/0286231 A1 | 9/2019 | Burns et al. |
| 2019/0310757 A1 | 10/2019 | Lee et al. |
| 2019/0313915 A1 | 10/2019 | Tzvieli et al. |
| 2019/0340419 A1 | 11/2019 | Milman et al. |
| 2019/0362562 A1 | 11/2019 | Benson |
| 2019/0377416 A1 | 12/2019 | Alexander |
| 2019/0385372 A1 | 12/2019 | Cartwright et al. |
| 2020/0050289 A1 | 2/2020 | Hardie-Bick et al. |
| 2020/0051527 A1 | 2/2020 | Ngo |
| 2020/0082629 A1 | 3/2020 | Jones et al. |
| 2020/0097077 A1 | 3/2020 | Nguyen et al. |
| 2020/0097091 A1 | 3/2020 | Chou et al. |
| 2020/0110280 A1 | 4/2020 | Gamperling et al. |
| 2020/0111260 A1 | 4/2020 | Osborn et al. |
| 2020/0211218 A1 | 7/2020 | Le Gallou et al. |
| 2020/0211512 A1 | 7/2020 | Sztuk et al. |
| 2020/0225736 A1 | 7/2020 | Schwarz et al. |
| 2020/0225758 A1 | 7/2020 | Tang et al. |
| 2020/0226814 A1 | 7/2020 | Tang et al. |
| 2020/0306640 A1 | 10/2020 | Kolen et al. |
| 2020/0312002 A1 | 10/2020 | Comploi et al. |
| 2020/0349635 A1 | 11/2020 | Ghoshal et al. |
| 2021/0007607 A1 | 1/2021 | Frank et al. |
| 2021/0011556 A1 | 1/2021 | Atlas et al. |
| 2021/0019911 A1 | 1/2021 | Kusakabe et al. |
| 2021/0088811 A1 | 3/2021 | Varady et al. |
| 2021/0090333 A1 | 3/2021 | Ravasz et al. |
| 2021/0124475 A1 | 4/2021 | Inch et al. |
| 2021/0134042 A1 | 5/2021 | Streuber et al. |
| 2021/0168324 A1 | 6/2021 | Ngo |
| 2021/0247846 A1 | 8/2021 | Shriram et al. |
| 2021/0296003 A1 | 9/2021 | Baeurele |
| 2021/0312658 A1 | 10/2021 | Aoki et al. |
| 2021/0383594 A1 | 12/2021 | Tang et al. |
| 2022/0092853 A1 | 3/2022 | Booth et al. |
| 2022/0157036 A1 | 5/2022 | Chen et al. |
| 2022/0292774 A1 | 9/2022 | Yang et al. |
| 2023/0115028 A1 | 4/2023 | Arunachala |
| 2023/0252721 A1 | 8/2023 | Aleem et al. |
| 2023/0351710 A1 | 11/2023 | Doyle et al. |
| 2024/0062492 A1 | 2/2024 | Booth et al. |

FOREIGN PATENT DOCUMENTS

| | | |
|---|---|---|
| JP | 2021517689 A | 7/2021 |
| WO | 2016177290 A1 | 11/2016 |
| WO | 2017205903 A1 | 12/2017 |
| WO | 2019137215 A1 | 7/2019 |
| WO | 2023075771 A1 | 5/2023 |

OTHER PUBLICATIONS

Goldsmiths M, "Dancing into the Metaverse: A Real-Time virtual Dance Experience," Youtube [online], Nov. 14, 2021 [Retrieved on Sep. 5, 2023], 2 pages, Retrieved from the Internet: URL: https://www.youtube.com/watch?v=aNg-gqZNYRO.

Hincapie-Ramos J.D., et aL, "GyroWand: IMU-Based Raycasting for Augmented Reality Head-Mounted Displays," Proceedings of the 3rd Association for Computing Machinery (ACM) Symposium on Spatial User Interaction, Los Angeles, CA, USA, Aug. 8-9, 2015, pp. 89-98.

International Preliminary Report on Patentability for International Application No. PCT/US2020/052976, mailed May 5, 2022, 9 pages.

International Preliminary Report on Patentability for International Application No. PCT/US2021/064674, mailed Jul. 6, 2023, 12 pages.

International Search Report and Written Opinion for International Application No. PCT/US2020/052976, mailed Dec. 11, 2020, 10 Pages.

International Search Report and Written Opinion for International Application No. PCT/US2021/064674, mailed Apr. 19, 2022, 13 pages.

International Search Report and Written Opinion for International Application No. PCT/US2022/046196, mailed Jan. 25, 2023, 11 pages.

International Search Report and Written Opinion for International Application No. PCT/US2023/020446, mailed Sep. 14, 2023, 14 pages.

Junghyun A., et al., "Motion Level-of-Detail: A Simplification Method on Crowd Scene," Proceedings of the 17th International Conference on Computer Animation and Social Agents [online], Jan. 23, 2013 [Retrieved on Sep. 7, 2023], 8 pages, Retrieved from the Internet: URL:https://citeseerx.ist.psu.edu/viewdoc/download;jsessionid=460ED1CB79EFA18B484B256E73A88FF3?.

Katz N., et al., "Extending Web Browsers with a Unity 3D-Based Virtual Worlds Viewer," IEEE Computer Society, Sep./Oct. 2011, vol. 15 (5), pp. 15-21.

Khan M.A., "Multiresolution Coding of Motion Capture Data for Real-Time Multimedia Applications," Multimedia Tools and Applications, Sep. 16, 2016, vol. 76, pp. 16683-16698.

Mayer S., et aL, "The Effect of Offset Correction and Cursor on Mid-Air Pointing in Real and Virtual Environments," Proceedings of the 2018 CHI Conference on Human Factors in Computing Systems, Montreal, QC, Canada, Apr. 21-26, 2018, pp. 1-13.

Milborrow S., "Active Shape Models with Stasm," [Retrieved on Sep. 20, 2022], 3 pages, Retrieved from the internet: URL: http://www.milbo.users.sonic.net/stasm/.

Milborrow S., et al., "Active Shape Models with SIFT Descriptors and Mars," Department of Electrical Engineering, 2014, 8 pages, Retrieved from the internet: URL: http://www.milbo.org/stasm-files/active-shape-models-with-sift-and-mars.pdf.

Moran F., et al., "Adaptive 3D Content for Multi-Platform On-Line Games," 2007 International Conference on Cyberworlds (CW'07), Oct. 24, 2007, pp. 194-201.

MRPT: "Ransac C++ Examples," 2014, 6 pages, Retrieved from the internet: URL: https://www.mrpt.org/tutorials/programming/maths-and-geometry/ransac-c-examples/.

Nextworldvr, "Realtime Motion Capture 3ds Max w/ KINECT," Youtube [online], Mar. 14, 2017 [Retrieved on Sep. 5, 2023], 2 pages, Retrieved from the Internet: URL:https://www.youtube.com/watch?v=vOYWYEOwRGO.

Olwal A., et al., "The Flexible Pointer: An Interaction Technique for Selection in Augmented and Virtual Reality," Proceedings of ACM Symposium on User Interface Software and Technology (UIST), Vancouver, BC, Nov. 2-5, 2003, pp. 81-82.

Qiao X., et al., "Web AR: A Promising Future for Mobile Augmented Reality—State of the Art, Challenges, and Insights," Proceedings of the IEEE, Apr. 2019, vol. 107 (4), pp. 651-666.

Renner P., et al., "Ray Casting", Central Facility Labs [Online], [Retrieved on Apr. 7, 2020], 2 pages, Retrieved from the Internet: URL:https://www.techfak.uni-bielefeld.de/~tpfeiffe/lehre/VirtualReality/interaction/ray_casting.html.

Savoye Y., et al., "Multi-Layer Level of Detail for Character Animation," Workshop in Virtual Reality Interactions and Physical Simulation VRIPHYS (2008) [online], Nov. 18, 2008 [Retrieved on Sep. 7, 2023], 10 pages, Retrieved from the Internet: URL: http://www.animlife.com/publications/vriphys08.pdf.

Schweigert R., et aL, "EyePointing: A Gaze-Based Selection Technique," Proceedings of Mensch and Computer, Hamburg, Germany, Sep. 8-11, 2019, pp. 719-723.

(56) References Cited

OTHER PUBLICATIONS

Srinivasa R.R., "Augmented Reality Adaptive Web Content," 13th IEEE Annual Consumer Communications Networking Conference (CCNC), 2016, pp. 1-4.

Trademark Application Serial No. 73289805, filed Dec. 15, 1980,1 page.

Trademark Application Serial No. 73560027, filed Sep. 25, 1985,1 page.

Trademark Application Serial No. 74155000, filed Apr. 8, 1991,1 page.

Trademark Application Serial No. 76036844, filed Apr. 28, 2000,1 page.

Unity Gets Toolkit for Common AR/VR Interactions, Unity XR interaction Toolkit Preview [Online], Dec. 19, 2019 Retrieved on Apr. 7, 2020], 1 page, Retrieved from the Internet: URL: http://youtu.be/ZPhv4qmT9EQ.

Whitton M., et al., "Integrating Real and Virtual Objects in Virtual Environments," Aug. 24, 2007, Retrieved from http://web.archive.org/web/20070824035829/ http://www.cs.unc.edu/~whitton/ExtendedCV/Papers/2005-HCII-Whitton-MixedEnvs.pdf, on May 3, 2017, 10 pages.

Wikipedia: "Canny Edge Detector," [Retrieved on Sep. 20, 2022], 10 pages, Retrieved from the internet: URL: https://en.wikipedia.org/wiki/Canny_edge_detector.

Wikipedia: "Iterative Closest Point," [Retrieved on Sep. 20, 2022], 3 pages, Retrieved from the internet: URL: https://en.wikipedia.org/wiki/Iterative_closest_point.

Huang B., et al., "Eye Landmarks Detection via Weakly Supervised Learning," Pattern Recognition, Feb. 2020, vol. 98, 11 pages.

International Preliminary Report on Patentability for International Application No. PCT/US2022/046196, mailed Apr. 25, 2024, 9 pages.

Tang X., et al., "Facial Landmark Detection by Semi-Supervised Deep Learning," Neurocomputing, Jul. 5, 2018, vol. 297, pp. 22-32.

Wan Z., et al., "A Method of Free-Space Point-of-Regard Estimation Based on 3D Eye Model and Stereo Vision," Applied Science, Sep. 30, 2018, vol. 08, No. 10, 17 pages.

Wu C., et al., "Automatic Eyeglasses Removal from Face Images," IEEE Transactions on Pattern Analysis and Machine Intelligence, Mar. 2004, vol. 26, No. 03, pp. 322-336.

INTERACTIVE AVATARS IN ARTIFICIAL REALITY

TECHNICAL FIELD

The present disclosure is directed to creating interactive avatars that can be positioned in the world as artificial reality content.

BACKGROUND

Artificial reality (XR) devices such as head-mounted displays (e.g., smart glasses, VR/AR headsets), mobile devices (e.g., smartphones, tablets), projection systems, "cave" systems, or other computing systems can present an artificial reality environment where users can interact with "virtual objects" (i.e., computer-generated object representations appearing in an artificial reality environment). These artificial virtual reality systems can track user movements and translate them into interactions with the virtual objects. For example, an artificial reality system can track a user's hands, translating a grab gesture as picking up a virtual object. In various cases, a user can select, move, scale/resize, skew, rotate, change colors/textures/skins of, or apply any other imaginable action to a virtual object. In some cases, users can also augment real-world objects, which exist independently of the computer system controlling the artificial reality environment. For example, a user can select a real object and add a virtual overlay to change the way the object appears in the environment (e.g., color, texture), select a real object and be shown a virtual user interface next to the object to interact with it, or cause other interactions with virtual objects. In some existing systems, users can actively control avatars to navigate characters of themselves in an artificial reality environment.

BRIEF DESCRIPTION OF THE DRAWINGS

The techniques introduced here may be better understood by referring to the following Detailed Description in conjunction with the accompanying drawings, in which like reference numerals indicate identical or functionally similar elements.

DETAILED DESCRIPTION

Figure 1:
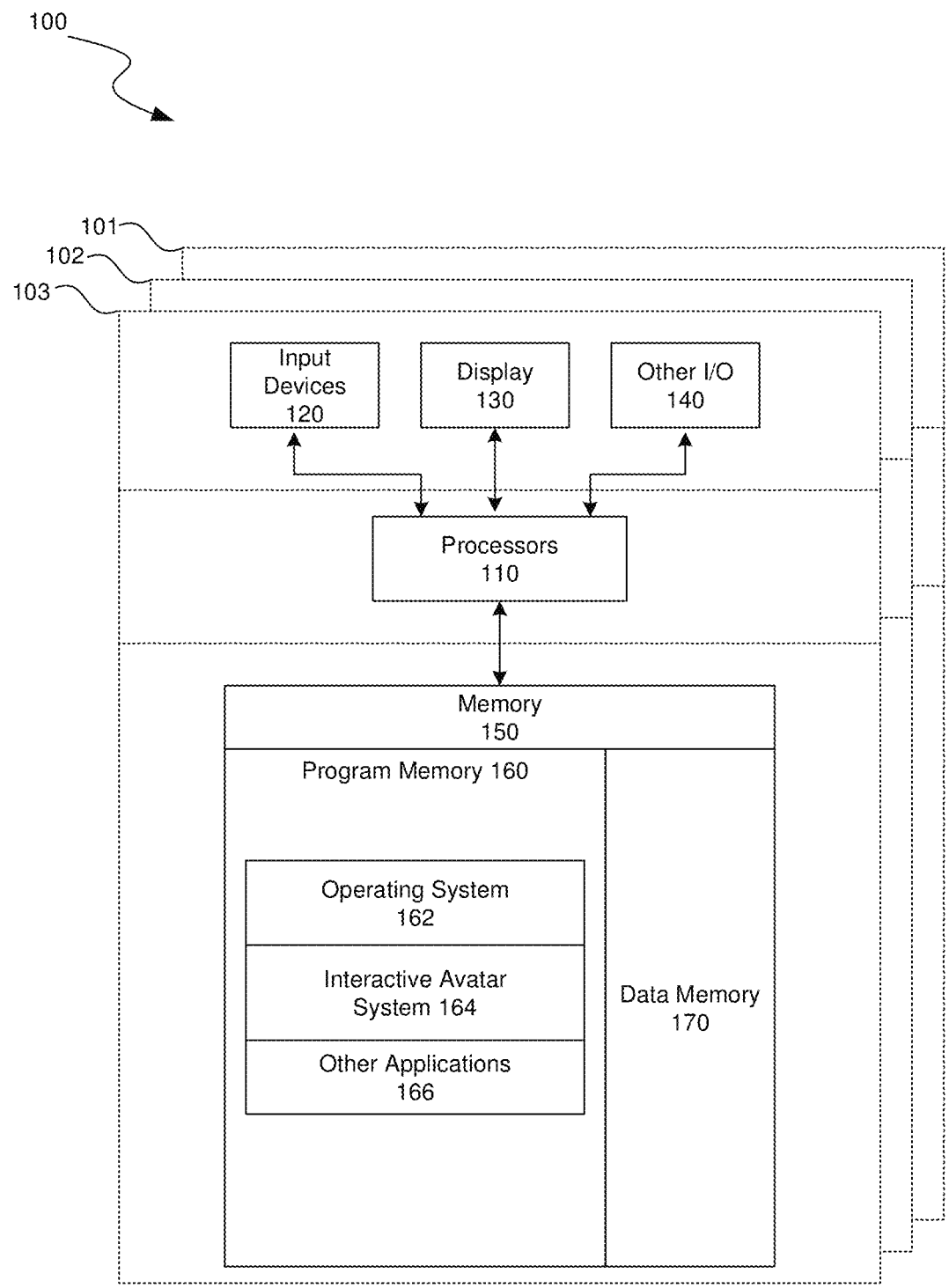
FIG. 1 is a block diagram illustrating an overview of devices on which some implementations of the present technology can operate.

Aspects of the present disclosure are directed to creating interactive avatars that can be positioned ("pinned") as world-locked artificial reality content. Once pinned, an avatar can react to the environment according to contextual factors and rules, without active control by the avatar owner. An interactive avatar system can configure the avatar with reactions, visual elements, and settings based on user selections. Once an avatar is configured and pinned to a location by an avatar owner, and when other XR devices are at that location (and have permissions to view the avatar), a central system can provide the avatar with its configurations to the other XR device. This allows a user of that other XR device to discover and interact with the avatar according to the configurations established by the avatar owner. Users can discover avatars in the artificial reality environment through push notifications, viewing a map showing nearby avatars, or simply viewing the artificial reality environment with an augmented reality (AR) or mixed reality (MR) device. The interactive avatar system can provide notifications to the avatar's owner of the avatar's status (e.g., what actions have been triggered, who has interacted with the avatar, whether the avatar is still active, etc.) while the user is not actively controlling the avatar. Additional details on pinning an avatar to a location, configuring it, and providing that avatar to another user via another XR device are provided below in relation to FIGS. 5 and 7.

The configurations for an avatar can specify where the avatar is located; how the avatar looks/appears; how the avatar reacts to other avatars, people, or objects; how long the avatar remains at the pinned location; privacy settings for who can see and interact with the avatar; etc. In various cases, the configuration can include establishing contextual reactions as rules that specify how an avatar will react to identified contexts. In some cases, the contextual reactions can include one or more default contextual reactions specifying basic avatar interactions. For example, the default reactions can identify if it is raining, causing the avatar can pull out an umbrella, or when the avatar encounters a friend of the avatar's owner, causing the avatar to waive or give the friend a high five. In some implementations, the avatar owner can select a "mood" for a pinned avatar (e.g., friendly, private, active, unobtrusive, etc.) which can apply a corresponding pre-determined set of actions matching the avatar's mood for various contexts. In some cases, a user can select individual pre-defined contextual reactions to apply to his avatar. For example, a library of pre-defined reactions can be available though a selection interface from which a user can make selections. For example, an avatar owner may select, from a library of defined reactions, reactions such as "dance when a friend is in the vicinity" or "sit on ground until a person is within 5 feet." In yet further implementations, a user may create a custom reaction by defining, in a scripting interface or through a reaction building widget, a reaction trigger and a corresponding action. In some cases, the avatar owner can update the avatar configuration after the avatar has been placed at the location in the artificial reality environment. Additional details on providing contextual reactions for an avatar are provided below in relation to FIG. 6.

Embodiments of the disclosed technology may include or be implemented in conjunction with an artificial reality system. Artificial reality or extra reality (XR) is a form of reality that has been adjusted in some manner before presentation to a user, which may include, e.g., virtual reality (VR), augmented reality (AR), mixed reality (MR), hybrid reality, or some combination and/or derivatives thereof. Artificial reality content may include completely generated content or generated content combined with captured content (e.g., real-world photographs). The artificial reality content may include video, audio, haptic feedback, or some combination thereof, any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, a "cave" environment or other projection system, or any other hardware platform capable of providing artificial reality content to one or more viewers.

"Virtual reality" or "VR," as used herein, refers to an immersive experience where a user's visual input is controlled by a computing system. "Augmented reality" or "AR" refers to systems where a user views images of the real world after they have passed through a computing system. For example, a tablet with a camera on the back can capture images of the real world and then display the images on the screen on the opposite side of the tablet from the camera. The tablet can process and adjust or "augment" the images as they pass through the system, such as by adding virtual objects. "Mixed reality" or "MR" refers to systems where light entering a user's eye is partially generated by a computing system and partially composes light reflected off objects in the real world. For example, a MR headset could be shaped as a pair of glasses with a pass-through display, which allows light from the real world to pass through a waveguide that simultaneously emits light from a projector in the MR headset, allowing the MR headset to present virtual objects intermixed with the real objects the user can see. "Artificial reality," "extra reality," or "XR," as used herein, refers to any of VR, AR, MR, or any combination or hybrid thereof.

Existing artificial reality systems require users to actively control their avatars when interacting with an artificial reality environment. Thus, a user's presence in an artificial reality environment ends when the leaves the artificial reality environment. Some existing systems provide virtual objects that are not user-controlled, these are typically non-customizable, relying on object actions established by a programmer or system administrator. Thus, once users of existing systems leave an artificial reality environment, these users have no way to maintain a presence in an artificial reality environment that is both engaging for other users and linked back to the originating user.

The interactive avatar system and processes disclosed herein are expected to overcome these problems with existing systems by enabling avatars with customizable interactions without the avatar owner having to actively control the avatar. Furthermore, the interactive avatar system provides a far more engaging experiences than existing systems by accommodating contextual reactions for these avatars that can pair myriad triggering events with avatar actions. The avatars can interact with other avatars, virtual objects in the environment, or the environment based on the avatar contextual reactions. For example, the avatar can wave at recognized people, appear happy or sad, hold an umbrella if it's raining in the environment, play a game with a passerby, etc. Further unlike existing systems, the power of these contextually driven avatars is realized without requiring users to have extensive programming knowledge. For example, a user can select a default set of contextual reactions, a set of contextual reactions corresponding to avatar personality or "mood," individual contextual reactions from a library, or create their own reactions using a contextual reaction builder. Finally, these avatars can enhance connections between users by being a conduit between the avatar owner and others. For example, the avatars can provide notification and updates to the avatar owner about actions the avatar has taken or other users with whom the avatar has interacted. In some cases, the avatar can be associated with controls that allow other users to send messages, likes, or otherwise connect with the avatar owner.

Several implementations are discussed below in more detail in reference to the figures. FIG. 1 is a block diagram illustrating an overview of devices on which some implementations of the disclosed technology can operate. The devices can comprise hardware components of a computing system 100 that allow an avatar owner to create interactive, contextually aware avatars that are pinned as world-locked artificial reality content that other users can discover and with which other users can interact. In various implementations, computing system 100 can include a single computing device 103 or multiple computing devices (e.g., computing device 101, computing device 102, and computing device 103) that communicate over wired or wireless channels to distribute processing and share input data. In some implementations, computing system 100 can include a stand-alone headset capable of providing a computer created or augmented experience for a user without the need for external processing or sensors. In other implementations, computing system 100 can include multiple computing devices such as a headset and a core processing component (such as a console, mobile device, or server system) where some processing operations are performed on the headset and others are offloaded to the core processing component. Example headsets are described below in relation to FIGS. 2A and 2B. In some implementations, position and environment data can be gathered only by sensors incorporated in the headset device, while in other implementations one or more of the non-headset computing devices can include sensor components that can track environment or position data.

Computing system 100 can include one or more processor(s) 110 (e.g., central processing units (CPUs), graphical processing units (GPUs), holographic processing units (HPUs), etc.) Processors 110 can be a single processing unit or multiple processing units in a device or distributed across multiple devices (e.g., distributed across two or more of computing devices 101-103).

Computing system 100 can include one or more input devices 120 that provide input to the processors 110, notifying them of actions. The actions can be mediated by a hardware controller that interprets the signals received from the input device and communicates the information to the processors 110 using a communication protocol. Each input device 120 can include, for example, a mouse, a keyboard, a touchscreen, a touchpad, a wearable input device (e.g., a haptics glove, a bracelet, a ring, an earring, a necklace, a watch, etc.), a camera (or other light-based input device, e.g., an infrared sensor), a microphone, or other user input devices.

Processors 110 can be coupled to other hardware devices, for example, with the use of an internal or external bus, such as a PCI bus, SCSI bus, or wireless connection. The processors 110 can communicate with a hardware controller for devices, such as for a display 130. Display 130 can be used to display text and graphics. In some implementations, display 130 includes the input device as part of the display, such as when the input device is a touchscreen or is equipped with an eye direction monitoring system. In some implementations, the display is separate from the input device. Examples of display devices are: an LCD display screen, an LED display screen, a projected, holographic, or augmented reality display (such as a heads-up display device or a head-mounted device), and so on. Other I/O devices 140 can also be coupled to the processor, such as a network chip or card, video chip or card, audio chip or card, USB, firewire or other external device, camera, printer, speakers, CD-ROM drive, DVD drive, disk drive, etc.

Computing system 100 can include a communication device capable of communicating wirelessly or wire-based with other local computing devices or a network node. The communication device can communicate with another device or a server through a network using, for example, TCP/IP protocols. Computing system 100 can utilize the communication device to distribute operations across multiple network devices.

The processors 110 can have access to a memory 150, which can be contained on one of the computing devices of computing system 100 or can be distributed across of the multiple computing devices of computing system 100 or other external devices. A memory includes one or more hardware devices for volatile or non-volatile storage, and can include both read-only and writable memory. For example, a memory can include one or more of random access memory (RAM), various caches, CPU registers, read-only memory (ROM), and writable non-volatile memory, such as flash memory, hard drives, floppy disks, CDs, DVDs, magnetic storage devices, tape drives, and so forth. A memory is not a propagating signal divorced from underlying hardware; a memory is thus non-transitory. Memory 150 can include program memory 160 that stores programs and software, such as an operating system 162, interactive avatar system 164, and other application programs 166. Memory 150 can also include data memory 170 that can include, e.g., avatar visual configurations, avatar reactions, avatar privacy and security settings, avatar action logs, libraries of pre-defined contextual reactions (which may be organized into default sets, moods, or individually selectable reactions), pre-defined triggers and actions for creating customized reactions, avatar maps or location data, avatar proximity notifications, settings, user options or preferences, etc., which can be provided to the program memory 160 or any element of the computing system 100.

Some implementations can be operational with numerous other computing system environments or configurations. Examples of computing systems, environments, and/or configurations that may be suitable for use with the technology include, but are not limited to, XR headsets, personal computers, server computers, handheld or laptop devices, cellular telephones, wearable electronics, gaming consoles, tablet devices, multiprocessor systems, microprocessor-based systems, set-top boxes, programmable consumer electronics, network PCs, minicomputers, mainframe computers, distributed computing environments that include any of the above systems or devices, or the like.

Figure 2A:
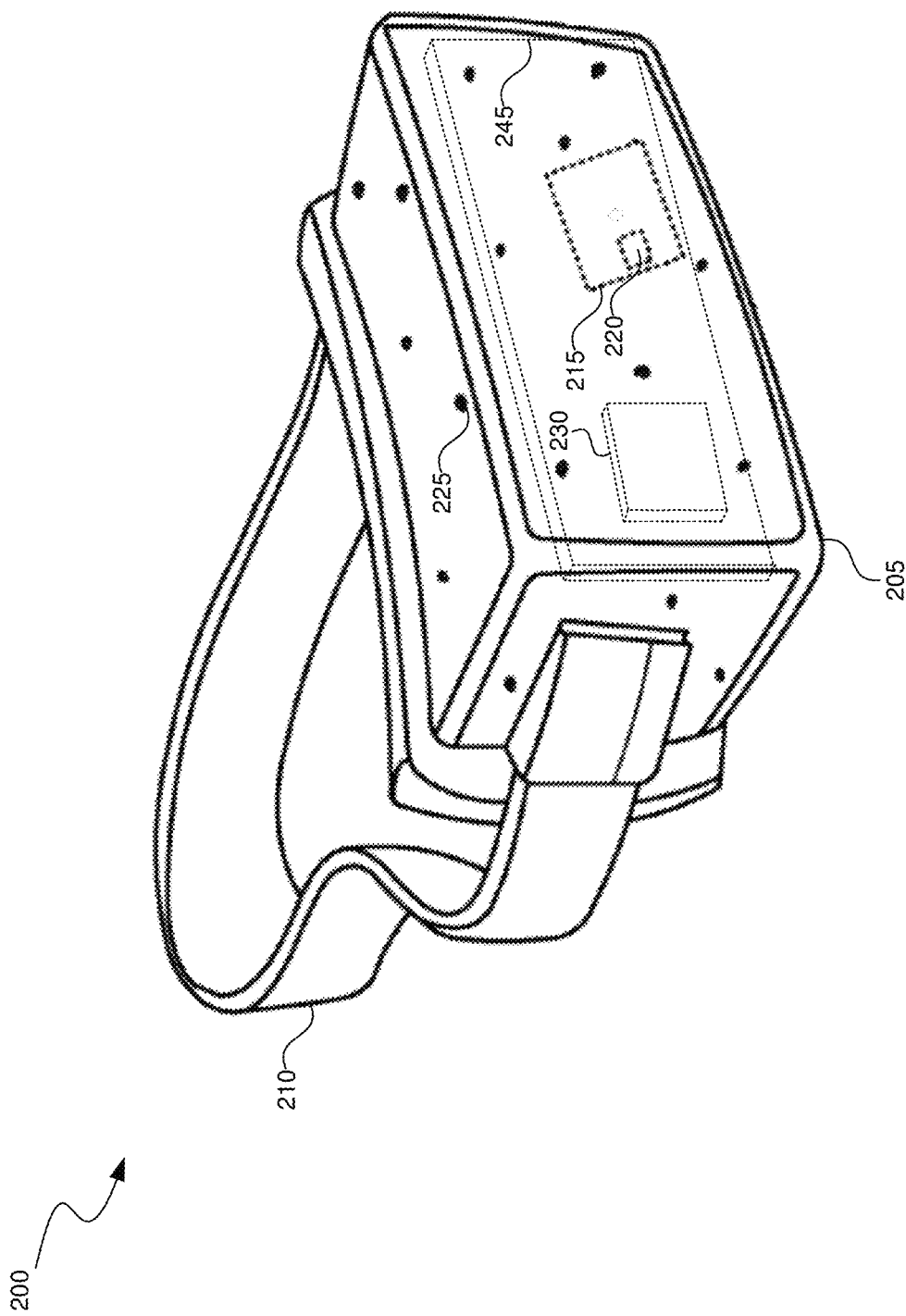
FIG. 2A is a wire diagram illustrating a virtual reality headset which can be used in some implementations of the present technology.

FIG. 2A is a wire diagram of a virtual reality head-mounted display (HMD) 200, in accordance with some embodiments. The HMD 200 includes a front rigid body 205 and a band 210. The front rigid body 205 includes one or more electronic display elements of an electronic display 245, an inertial motion unit (IMU) 215, one or more position sensors 220, locators 225, and one or more compute units 230. The position sensors 220, the IMU 215, and compute units 230 may be internal to the HMD 200 and may not be visible to the user. In various implementations, the IMU 215, position sensors 220, and locators 225 can track movement and location of the HMD 200 in the real world and in a virtual environment in three degrees of freedom (3 DoF) or six degrees of freedom (6 DoF). For example, the locators 225 can emit infrared light beams which create light points on real objects around the HMD 200. As another example, the IMU 215 can include e.g., one or more accelerometers, gyroscopes, magnetometers, other non-camera-based position, force, or orientation sensors, or combinations thereof. One or more cameras (not shown) integrated with the HMD 200 can detect the light points. Compute units 230 in the HMD 200 can use the detected light points to extrapolate position and movement of the HMD 200 as well as to identify the shape and position of the real objects surrounding the HMD 200.

The electronic display 245 can be integrated with the front rigid body 205 and can provide image light to a user as dictated by the compute units 230. In various embodiments, the electronic display 245 can be a single electronic display or multiple electronic displays (e.g., a display for each user eye). Examples of the electronic display 245 include: a liquid crystal display (LCD), an organic light-emitting diode (OLED) display, an active-matrix organic light-emitting diode display (AMOLED), a display including one or more quantum dot light-emitting diode (QOLED) sub-pixels, a projector unit (e.g., microLED, LASER, etc.), some other display, or some combination thereof.

In some implementations, the HMD 200 can be coupled to a core processing component such as a personal computer (PC) (not shown) and/or one or more external sensors (not shown). The external sensors can monitor the HMD 200 (e.g., via light emitted from the HMD 200) which the PC can use, in combination with output from the IMU 215 and position sensors 220, to determine the location and movement of the HMD 200.

Figure 2B:
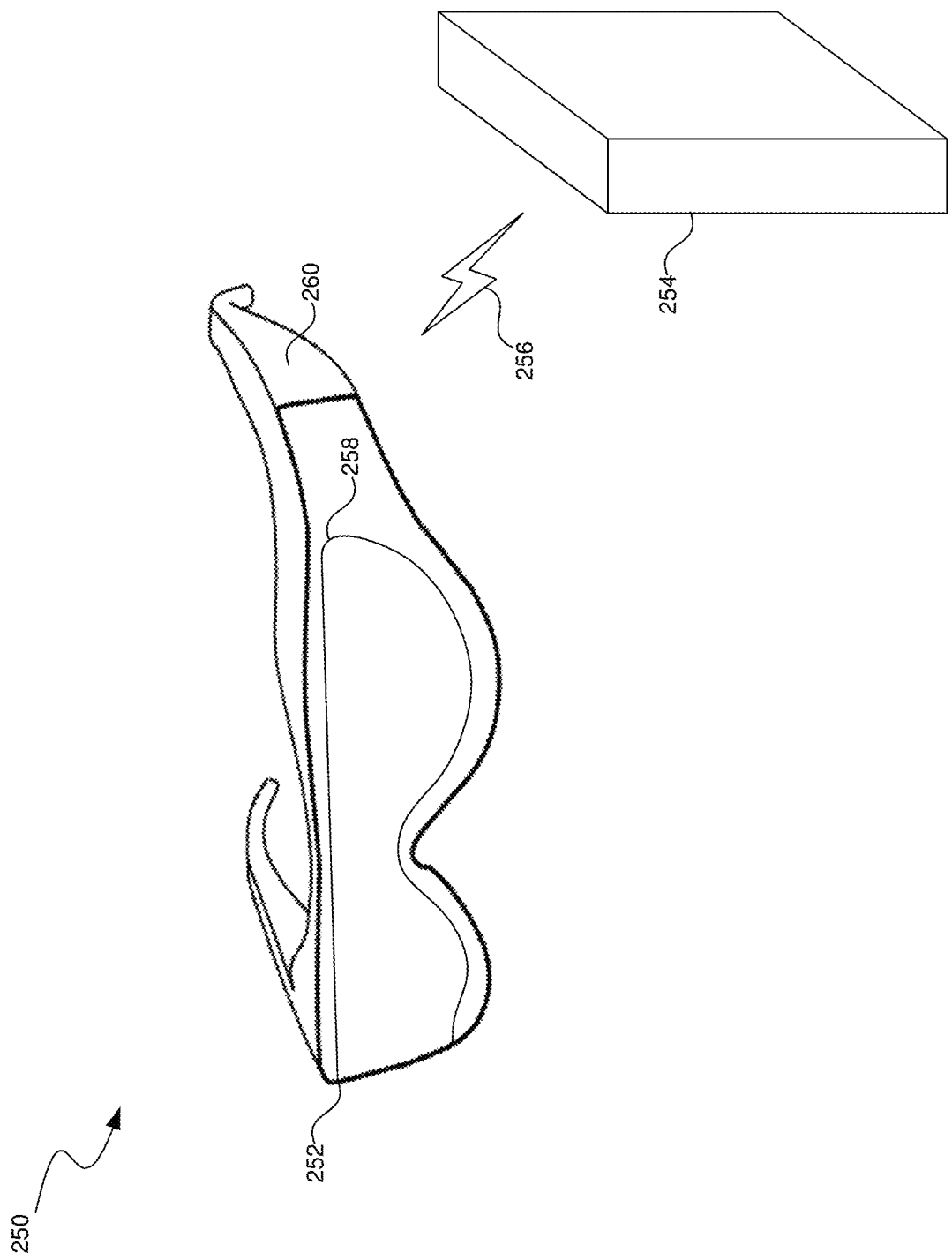
FIG. 2B is a wire diagram illustrating a mixed reality headset which can be used in some implementations of the present technology.

FIG. 2B is a wire diagram of a mixed reality HMD system 250 which includes a mixed reality HMD 252 and a core processing component 254. The mixed reality HMD 252 and the core processing component 254 can communicate via a wireless connection (e.g., a 60 GHz link) as indicated by link 256. In other implementations, the mixed reality system 250 includes a headset only, without an external compute device or includes other wired or wireless connections between the mixed reality HMD 252 and the core processing component 254. The mixed reality HMD 252 includes a pass-through display 258 and a frame 260. The frame 260 can house various electronic components (not shown) such as light projectors (e.g., LASERs, LEDs, etc.), cameras, eye-tracking sensors, MEMS components, networking components, etc.

The projectors can be coupled to the pass-through display 258, e.g., via optical elements, to display media to a user. The optical elements can include one or more waveguide assemblies, reflectors, lenses, mirrors, collimators, gratings, etc., for directing light from the projectors to a user's eye. Image data can be transmitted from the core processing component 254 via link 256 to HMD 252. Controllers in the HMD 252 can convert the image data into light pulses from the projectors, which can be transmitted via the optical elements as output light to the user's eye. The output light can mix with light that passes through the display 258, allowing the output light to present virtual objects that appear as if they exist in the real world.

Similarly to the HMD 200, the HMD system 250 can also include motion and position tracking units, cameras, light sources, etc., which allow the HMD system 250 to, e.g., track itself in 3 DoF or 6 DoF, track portions of the user (e.g., hands, feet, head, or other body parts), map virtual objects to appear as stationary as the HMD 252 moves, and have virtual objects react to gestures and other real-world objects.

Figure 2C:
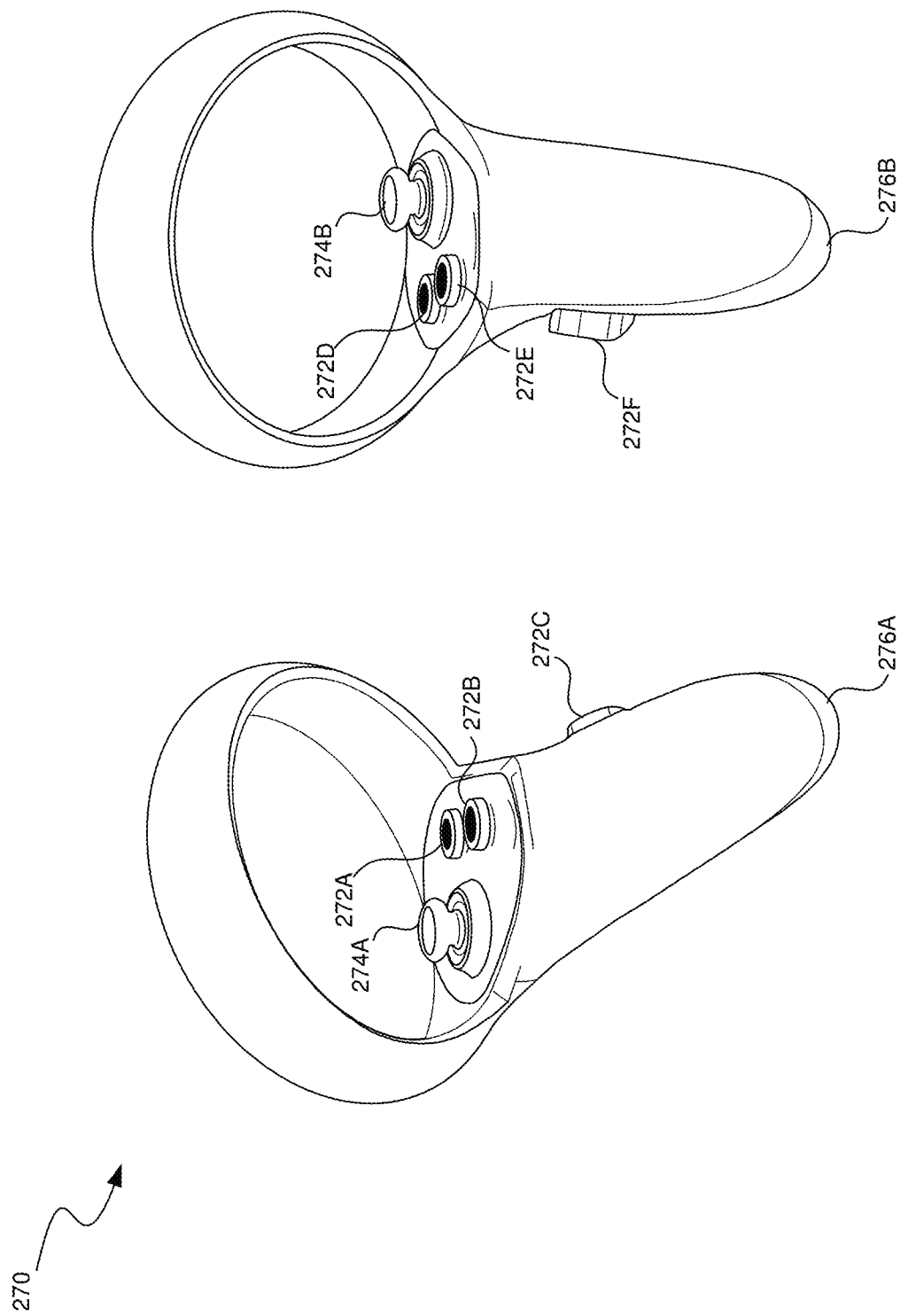
FIG. 2C illustrates controllers, which, in some implementations, a user can hold in one or both hands to interact with an artificial reality environment.

FIG. 2C illustrates controllers 270, which, in some implementations, a user can hold in one or both hands to interact with an artificial reality environment presented by the HMD 200 and/or HMD 250. The controllers 270 can be in communication with the HMDs, either directly or via an external device (e.g., core processing component 254). The controllers can have their own IMU units, position sensors, and/or can emit further light points. The HMD 200 or 250, external sensors, or sensors in the controllers can track these controller light points to determine the controller positions and/or orientations (e.g., to track the controllers in 3 DoF or 6 DoF). The compute units 230 in the HMD 200 or the core processing component 254 can use this tracking, in combination with IMU and position output, to monitor hand positions and motions of the user. The controllers can also include various buttons (e.g., buttons 272A-F) and/or joysticks (e.g., joysticks 274A-B), which a user can actuate to provide input and interact with objects.

In various implementations, the HMD 200 or 250 can also include additional subsystems, such as an eye tracking unit, an audio system, various network components, etc. To monitor indications of user interactions and intentions. For example, in some implementations, instead of or in addition to controllers, one or more cameras included in the HMD 200 or 250, or from external cameras, can monitor the positions and poses of the user's hands to determine gestures and other hand and body motions.

Figure 3:
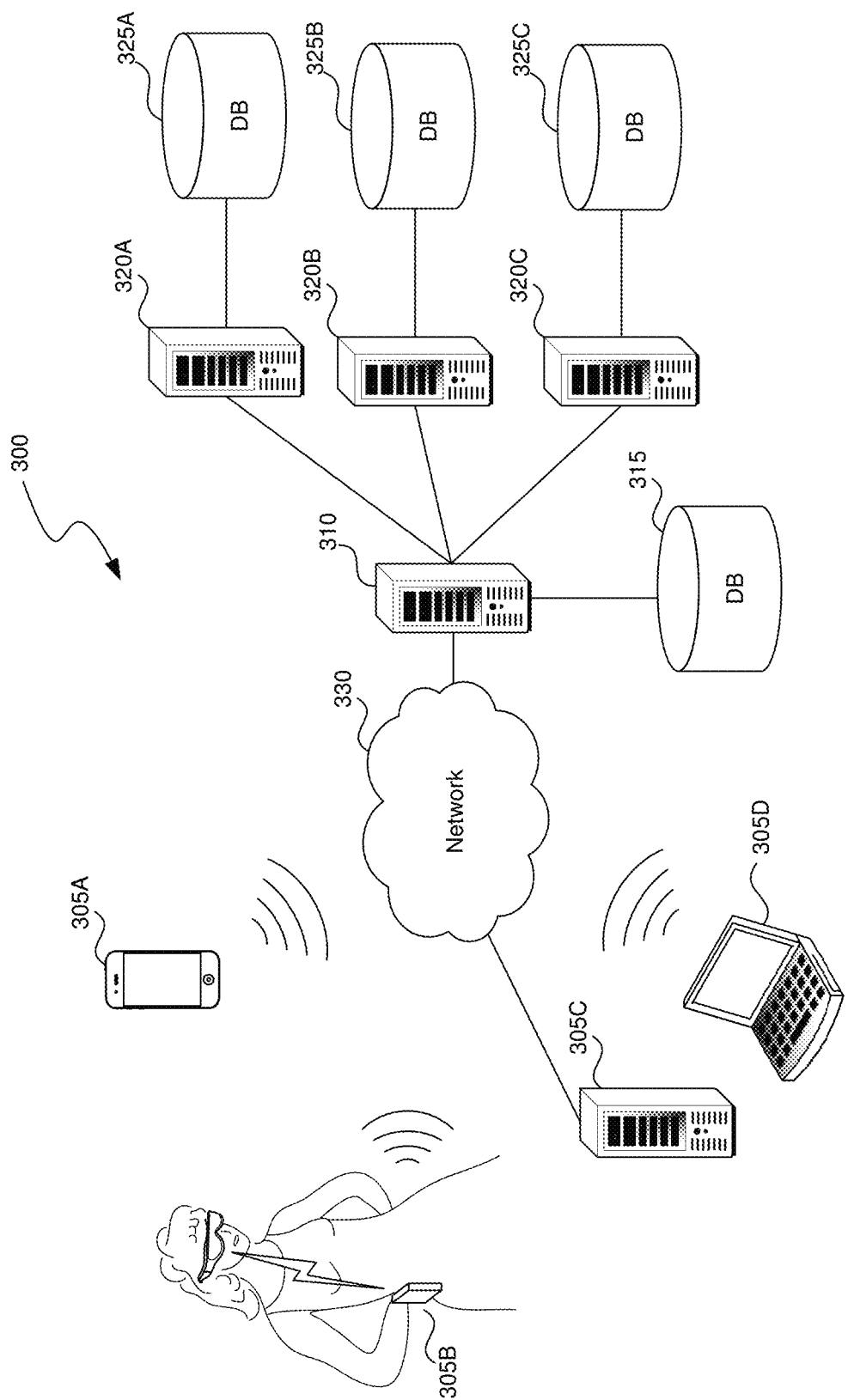
FIG. 3 is a block diagram illustrating an overview of an environment in which some implementations of the present technology can operate.

FIG. 3 is a block diagram illustrating an overview of an environment 300 in which some implementations of the disclosed technology can operate. Environment 300 can include one or more client computing devices 305A-D, examples of which can include computing system 100. In some implementations, some of the client computing devices (e.g., client computing device 305B) can be the HMD 200 or the HMD system 250. Client computing devices 305 can operate in a networked environment using logical connections through network 330 to one or more remote computers, such as a server computing device.

In some implementations, server 310 can be an edge server which receives client requests and coordinates fulfillment of those requests through other servers, such as servers 320A-C. Server computing devices 310 and 320 can comprise computing systems, such as computing system 100. Though each server computing device 310 and 320 is displayed logically as a single server, server computing devices can each be a distributed computing environment encompassing multiple computing devices located at the same or at geographically disparate physical locations.

Client computing devices 305 and server computing devices 310 and 320 can each act as a server or client to other server/client device(s). Server 310 can connect to a database 315. Servers 320A-C can each connect to a corresponding database 325A-C. As discussed above, each server 310 or 320 can correspond to a group of servers, and each of these servers can share a database or can have their own database. Though databases 315 and 325 are displayed logically as single units, databases 315 and 325 can each be a distributed computing environment encompassing multiple computing devices, can be located within their corresponding server, or can be located at the same or at geographically disparate physical locations.

Network 330 can be a local area network (LAN), a wide area network (WAN), a mesh network, a hybrid network, or other wired or wireless networks. Network 330 may be the Internet or some other public or private network. Client computing devices 305 can be connected to network 330 through a network interface, such as by wired or wireless communication. While the connections between server 310 and servers 320 are shown as separate connections, these connections can be any kind of local, wide area, wired, or wireless network, including network 330 or a separate public or private network.

In some implementations, servers 310 and 320 can be used as part of a social network. The social network can maintain a social graph and perform various actions based on the social graph. A social graph can include a set of nodes (representing social networking system objects, also known as social objects) interconnected by edges (representing interactions, activity, or relatedness). A social networking system object can be a social networking system user, nonperson entity, content item, group, social networking system page, location, application, subject, concept representation or other social networking system object, e.g., a movie, a band, a book, etc. Content items can be any digital data such as text, images, audio, video, links, webpages, minutia (e.g., indicia provided from a client device such as emotion indicators, status text snippets, location indictors, etc.), or other multi-media. In various implementations, content items can be social network items or parts of social network items, such as posts, likes, mentions, news items, events, shares, comments, messages, other notifications, etc. Subjects and concepts, in the context of a social graph, comprise nodes that represent any person, place, thing, or idea.

A social networking system can enable a user to enter and display information related to the user's interests, age/date of birth, location (e.g., longitude/latitude, country, region, city, etc.), education information, life stage, relationship status, name, a model of devices typically used, languages identified as ones the user is facile with, occupation, contact information, or other demographic or biographical information in the user's profile. Any such information can be represented, in various implementations, by a node or edge between nodes in the social graph. A social networking system can enable a user to upload or create pictures, videos, documents, songs, or other content items, and can enable a user to create and schedule events. Content items can be represented, in various implementations, by a node or edge between nodes in the social graph.

A social networking system can enable a user to perform uploads or create content items, interact with content items or other users, express an interest or opinion, or perform other actions. A social networking system can provide various means to interact with non-user objects within the social networking system. Actions can be represented, in various implementations, by a node or edge between nodes in the social graph. For example, a user can form or join groups, or become a fan of a page or entity within the social networking system. In addition, a user can create, download, view, upload, link to, tag, edit, or play a social networking system object. A user can interact with social networking system objects outside of the context of the social networking system. For example, an article on a news web site might have a "like" button that users can click. In each of these instances, the interaction between the user and the object can be represented by an edge in the social graph connecting the node of the user to the node of the object. As another example, a user can use location detection functionality (such as a GPS receiver on a mobile device) to "check in" to a particular location, and an edge can connect the user's node with the location's node in the social graph.

A social networking system can provide a variety of communication channels to users. For example, a social networking system can enable a user to email, instant message, or text/SMS message, one or more other users. It can enable a user to post a message to the user's wall or profile or another user's wall or profile. It can enable a user to post a message to a group or a fan page. R can enable a user to comment on an image, wall post or other content item created or uploaded by the user or another user. And it can allow users to interact (via their personalized avatar) with objects or other avatars in a virtual environment, etc. In some embodiments, a user can post a status message to the user's profile indicating a current event, state of mind, thought, feeling, activity, or any other present-time relevant communication. A social networking system can enable users to communicate both within, and external to, the social networking system. For example, a first user can send a second user a message within the social networking system, an email through the social networking system, an email external to but originating from the social networking system, an instant message within the social networking system, an instant message external to but originating from the social networking system, provide voice or video messaging between users, or provide a virtual environment were users can communicate and interact via avatars or other digital representations of themselves. Further, a first user can comment on the profile page of a second user, or can comment on objects associated with a second user, e.g., content items uploaded by the second user.

Social networking systems enable users to associate themselves and establish connections with other users of the social networking system. When two users (e.g., social graph nodes) explicitly establish a social connection in the social networking system, they become "friends" (or, "connections") within the context of the social networking system. For example, a friend request from a "John Doe" to a "Jane Smith," which is accepted by "Jane Smith," is a social connection. The social connection can be an edge in the social graph. Being friends or being within a threshold number of friend edges on the social graph can allow users access to more information about each other than would otherwise be available to unconnected users. For example, being friends can allow a user to view another user's profile, to see another user's friends, or to view pictures of another user. Likewise, becoming friends within a social networking system can allow a user greater access to communicate with another user, e.g., by email (internal and external to the social networking system), instant message, text message, phone, or any other communicative interface. Being friends can allow a user access to view, comment on, download, endorse or otherwise interact with another user's uploaded content items. Establishing connections, accessing user information, communicating, and interacting within the context of the social networking system can be represented by an edge between the nodes representing two social networking system users.

In addition to explicitly establishing a connection in the social networking system, users with common characteristics can be considered connected (such as a soft or implicit connection) for the purposes of determining social context for use in determining the topic of communications. In some embodiments, users who belong to a common network are considered connected. For example, users who attend a common school, work for a common company, or belong to a common social networking system group can be considered connected. In some embodiments, users with common biographical characteristics are considered connected. For example, the geographic region users were born in or live in, the age of users, the gender of users and the relationship status of users can be used to determine whether users are connected. In some embodiments, users with common interests are considered connected. For example, users' movie preferences, music preferences, political views, religious views, or any other interest can be used to determine whether users are connected. In some embodiments, users who have taken a common action within the social networking system are considered connected. For example, users who endorse or recommend a common object, who comment on a common content item, or who RSVP to a common event can be considered connected. A social networking system can utilize a social graph to determine users who are connected with or are similar to a particular user in order to determine or evaluate the social context between the users. The social networking system can utilize such social context and common attributes to facilitate content distribution systems and content caching systems to predictably select content items for caching in cache appliances associated with specific social network accounts.

Figure 4:
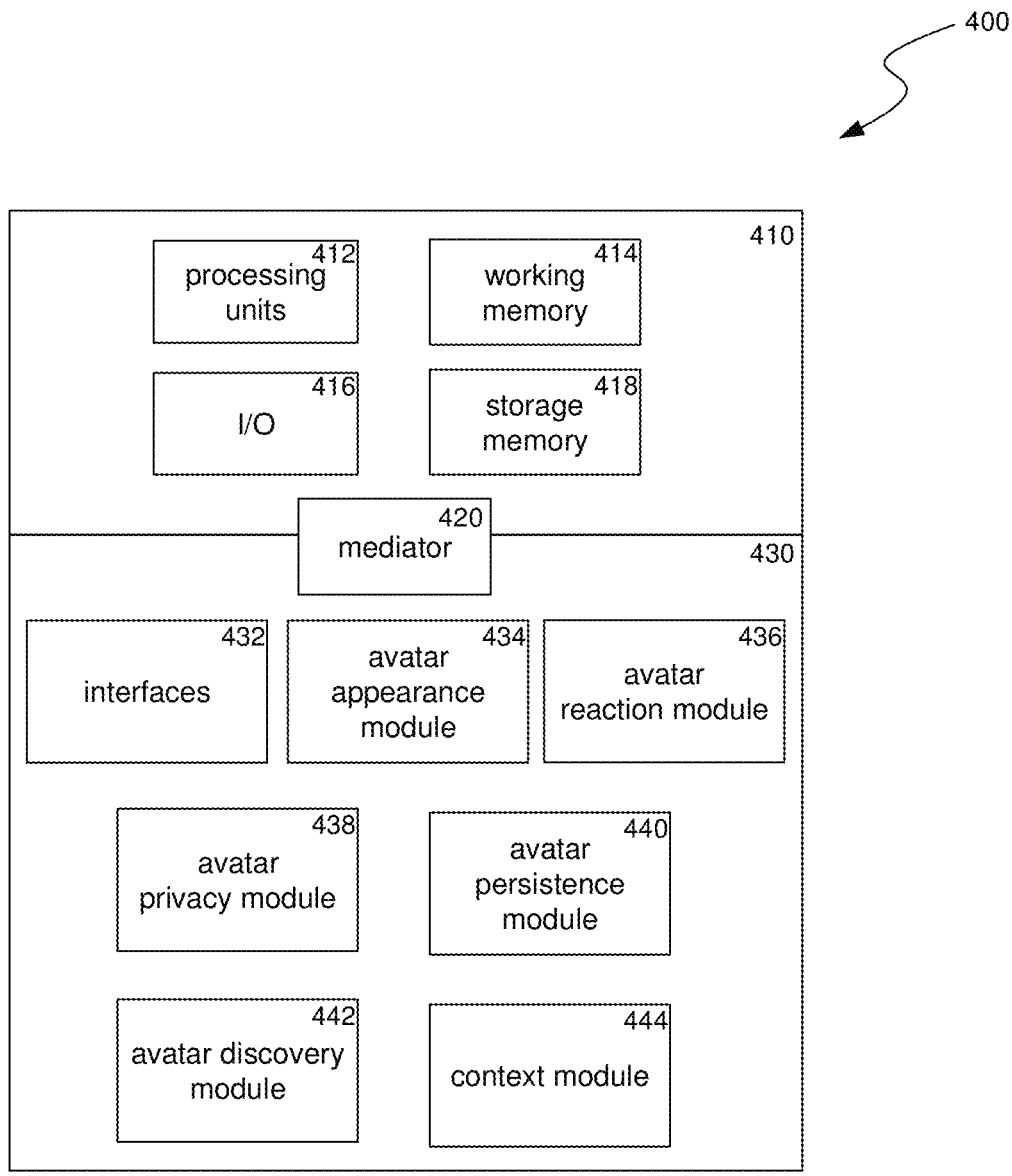
FIG. 4 is a block diagram illustrating components which, in some implementations, can be used in a system employing the disclosed technology.

FIG. 4 is a block diagram illustrating components 400 which, in some implementations, can be used in a system employing the disclosed technology. Components 400 can be included in one device of computing system 100 or can be distributed across multiple of the devices of computing system 100. The components 400 include hardware 410, mediator 420, and specialized components 430. As discussed above, a system implementing the disclosed technology can use various hardware including processing units 412, working memory 414, input and output devices 416 (e.g., cameras, displays, IMU units, network connections, etc.), and storage memory 418. In various implementations, storage memory 418 can be one or more of: local devices, interfaces to remote storage devices, or combinations thereof. For example, storage memory 418 can be one or more hard drives or flash drives accessible through a system bus or can be a cloud storage provider (such as in storage 315 or 325) or other network storage accessible via one or more communications networks. In various implementations, components 400 can be implemented in a client computing device such as client computing devices 305 or on a server computing device, such as server computing device 310 or 320.

Mediator 420 can include components which mediate resources between hardware 410 and specialized components 430. For example, mediator 420 can include an operating system, services, drivers, a basic input output system (BIOS), controller circuits, or other hardware or software systems.

Specialized components 430 can include software or hardware configured to perform operations for establishing and controlling interactive, pinned avatars. Specialized components 430 can include avatar appearance module 434, avatar reaction module 436, avatar privacy module 438, avatar persistence module 440, avatar discovery module 442, context module 444, and components and APIs which can be used for providing user interfaces, transferring data, and controlling the specialized components, such as interfaces 432. In some implementations, components 400 can be in a computing system that is distributed across multiple computing devices or can be an interface to a server-based application executing one or more of specialized components 430. While discussed below as being on an avatar owner or avatar viewer system, in some cases, each block can be part of an interactive avatar provider platform (e.g., on a server). Although depicted as separate components, specialized components 430 may be logical or other non-physical differentiations of functions and/or may be sub-modules or code-blocks of one or more applications.

Avatar appearance module 434, on an avatar owner system, can establish an appearance of an avatar based on user selections. For example, the avatar appearance can include setting height, body type, gender, facial features, clothing and accessories, skin tone, hair color and style, eye color, etc. Avatar appearance module 434, on an avatar viewer system, can show the avatar's appearance based on the avatar owner's selection and reactions configured for the avatar. Additional details on setting an avatar's appearance are discussed below in relation to block 506 of FIG. 5 and block 706 of FIG. 7.

Avatar reaction module 436, on an avatar owner system, can set reactions for an avatar, where a reaction includes a trigger and one or more corresponding avatar action. Reactions can be set as default reactions, selected from pre-configured reactions, selected as a group of reactions corresponding to a selected mood, or created as custom reactions. Avatar reaction module 436, on an avatar viewer system, can determine if a trigger, for one of the reactions assigned to an avatar that a viewing user is viewing, occurred (e.g., based on a context from context module 444), If so, avatar reaction module 436 can cause the avatar to take the corresponding action(s). Additional details on setting and triggering avatar reactions are discussed below in relation to block 508 of FIG. 5, FIG. 6, and block 710 of FIG. 7.

Avatar privacy module 438, on an avatar owner system, can set avatar privacy, controlling who can discover and view a given avatar. The avatar privacy can be set for individual users, for groups with which a user may have membership, and/or for types of users (e.g., based on relationships between the avatar owner and the viewing user). Avatar privacy module 438, on an avatar viewer system, can receive identifications of potential avatar viewing users and determine, based on the avatar privacy, whether that user is permitted to discover and view the avatar. Additional details on avatar privacy are discussed below in relation to block 510 of FIG. 5 and blocks 702-706 of FIG. 7.

Avatar persistence module 440, on an avatar owner system, can receive from an avatar owner an indication of whether an avatar should expire and, if so, upon what event (e.g., timer expire, certain date/time, determined context). Avatar persistence module 440, on an avatar viewer system, can determine whether the event has occurred to cause the avatar to no longer appear (or begin to appear). Additional details on avatar persistence are discussed below in relation to block 512 of FIG. 5 and blocks 702-706 of FIG. 7.

Avatar discovery module 442, on an avatar viewer system, can provide indications of avatars in a given area for a viewing user. For example, the viewing user can be provided notifications of avatars in her area or can view a map or list for a given area to see available avatars. Additional details on avatar discovery are discussed below in relation to blocks 702 and 704 of FIG. 7.

Context module 444, on an avatar viewer system, can determine context conditions for determining whether reactions assigned to an avatar are triggered. Context module 444 can interface with local sensors and cameras (e.g., via devices of I/O 416) to identify objects and surfaces in the area and external data sources (e.g., via a network interface of I/O 416) to identify context factors such as weather, avatar owner controls or status, social media events, etc. For example, context module 444 can review the trigger statements for reactions associated with an avatar being viewed and can obtain the data necessary to determine if any of the trigger statements evaluate to true. Additional details on determining a context for triggering reactions are discussed below in relation to block 708 of FIG. 7.

Those skilled in the art will appreciate that the components illustrated in FIGS. 1-4 described above, and in each of the flow diagrams discussed below, may be altered in a variety of ways. For example, the order of the logic may be rearranged, substeps may be performed in parallel, illustrated logic may be omitted, other logic may be included, etc. In some implementations, one or more of the components described above can execute one or more of the processes described below.

Figure 5:
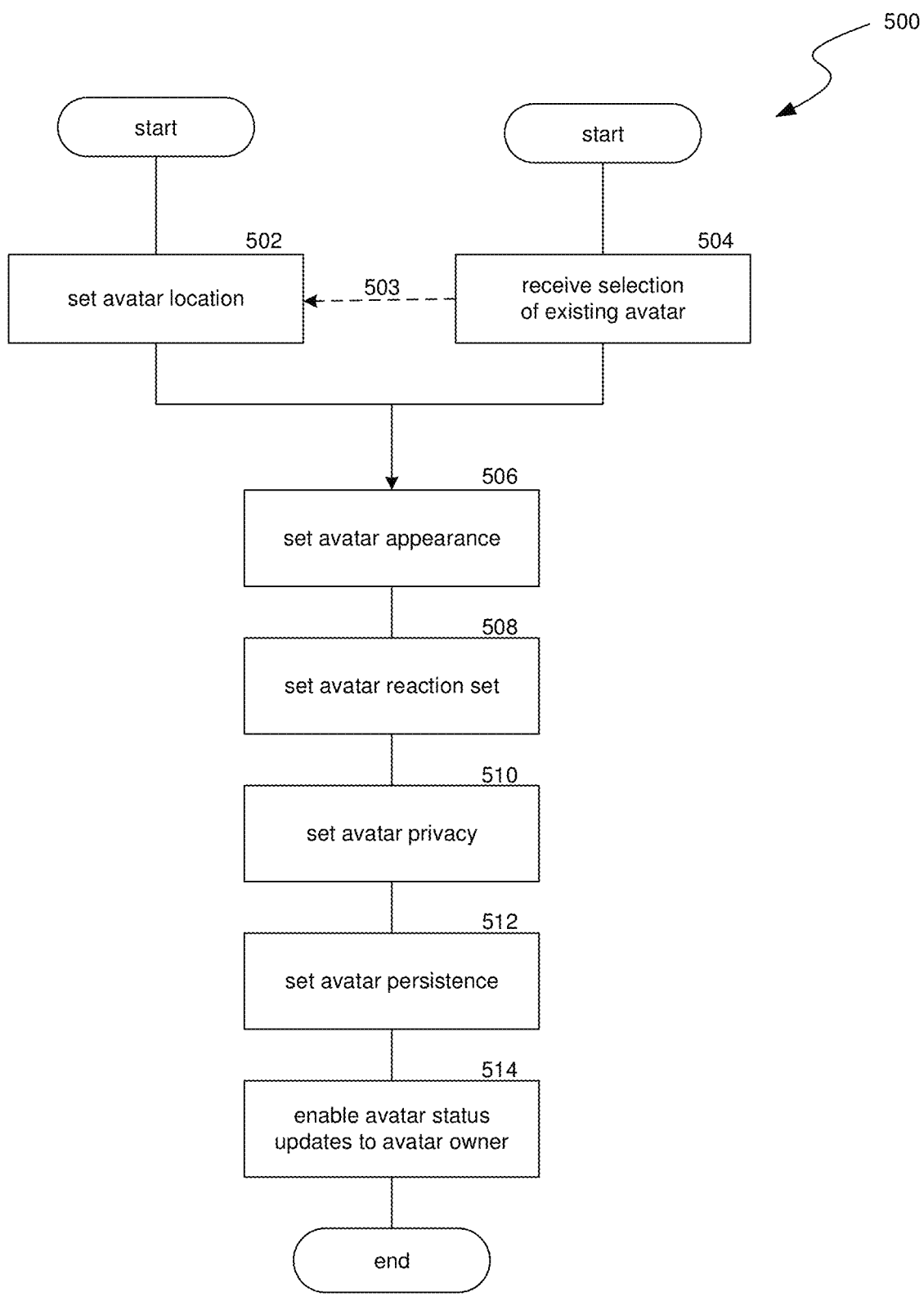
FIG. 5 is a flow diagram illustrating a process used in some implementations of the present technology for configuring an avatar to be pinned at a location.

FIG. 5 is a flow diagram illustrating a process 500 used in some implementations of the present technology for configuring an avatar to be pinned at a location. In some implementations, process 500 can be initiated by a user implementing an interface for pinning an avatar to a location or for accessing an existing pinned avatar. In various implementations, this interface can be manually implemented by the user (e.g., by executing an application or accessing a control) or can opened in response to a suggested to the user (e.g., when an XR device recognizes that the user is at a location where the user may want to pin an avatar, such as a landmark, a location where another user has pinned an avatar, or location with characteristics identified as beneficial to pinning an avatar). In some implementations, process 500 can be performed on an end user's computing device (e.g., mobile phone, XR headset, or other device) or on a central system such as a server of a social media system or other computing system of a platform for the interactive avatar system. Process 500 is illustrated with multiple first blocks (502 and 504), illustrating that process 500 can be started either for pinning a new avatar (from block 502) or accessing and existing avatar (from block 504). In some cases, one or more of the block below can be skipped, e.g., when a user has selected an existing avatar and does not need to update one or more of the appearance at block 506, the reaction set at 508, the privacy settings at 510, or the avatar persistence at 512.

At block 502, process 500 can set a world-locked location for a new avatar. In some implementations, this can be performed when the avatar's owner is at the new location, with the avatar owner selecting the avatar location, e.g., by performing an air tap, dropping an avatar representation into the artificial reality environment, selecting the location on a display of an AR device, etc. In other implementations, the avatar owner may not be at the location, but is able to select the location remotely, e.g., by dropping a pin at the location on a map or selecting the location in a virtual recreation of the area. A location can be specified as a specific location (e.g., latitude and longitude coordinates), a location relative to a landmark or other known position, or can be a defined area in which the avatar can move about.

In alternative cases, a user can implement process 500 for an existing avatar at block 504, where process 500 can receive a selection of the existing avatar. For example, a user may have access to a list of avatars she previously pinned to various locations or may be able to access a map with pins showing locations of her avatars. In some cases, the same avatar may be pinned in multiple places and the user can select that avatar, having changes applied to each instance. In some implementations, a user may be able to update the location of an existing avatar, in which case process can proceed from block 504 to block 502 (as indicated by line 503) to set a new location for the selected avatar. If the user is not updating the avatar's location, process 500 can proceed to block 506.

At block 506, process 500 can set or update an appearance for the avatar. For example, the user can select from a set of pre-defined avatars or choose avatar visual attributes such as height, body type, gender, facial features, clothing and accessories, skin tone, hair color and style, eye color, etc. In some cases, a generated avatar can be saved to later be easily pinned at another location. In various implementations, the avatar can be reminiscent of the avatar owner or can have fanciful features such as robotic or animal elements, etc. The user may be able to set clothing and accessories from a library, such as for clothing articles, jewelry, glasses, things the avatar is holding, etc. The avatar owner may also select accessories that the avatar can use in particular circumstances (as triggered in reactions discussed below), but may not always be shown. In some cases, the user may also set extras for the avatar such as a textual message, voice recording, or video recording to display with the avatar.

At block 508, process 500 can set a reaction set for the avatar. An avatar can be assigned any number of reactions where each reaction can include a trigger and an action. Each trigger can include some detectable event from something as simple as an elapsed timer to as complicated as a series of conditionals for various data sources such as nearby people and their actions, area weather, nearby real or virtual objects or landmarks, news events, date or time of day, and many others. Each action can include any action that an avatar can be programmed to perform and can be as simple as a displaying text or performing a canned animation to as complicated as a series of actions that interact with real and/or virtual objects in the environment of the avatar. As a simple example, a reaction can include a "raining" trigger and a "user umbrella accessory" action, which gets current weather data for an area in which the avatar is pinned and, if that weather data indicates current rain, causes the avatar to appear to pull out an umbrella and hold it over the avatar's head.

In some implementations, some of the avatar's reactions can be defined with geo-fencing triggers that specify changes to the avatar (e.g., how the avatar looks, what accessories the avatar has, or how the avatar acts) based on the area in which the avatar is placed. For example, if an avatar is placed outside a popular coffee shop, the avatar may have a trigger to recognize that location based on mapping data and change its accessories to have a cup of coffee branded from that shop. In some implementations, business owners or other promoters can setup such geo-fencing rules for avatars, whereby avatar owners can select to enable local reactions when placing an avatar in that area. Continuing the previous example, the coffee show reaction can be a promotion whereby avatar owners are permitted to enable that reaction when they buy a coffee from the shop, pin a local avatar, and enter a code from their coffee receipt.

In some cases, some of the avatar's reactions can be "canned" actions/animations, i.e., predefined animations that are not necessarily context based. For example, a reaction can be for the avatar to waive periodically, sit on a bench and read, dance around a fountain, etc.

In yet other cases, some of the avatar's reactions can be context based, where details about the world around the avatar, a user interacting with the avatar, a status of the avatar owner, what has previously happened to an avatar, and other complex rules sets can be applied to the avatar. Additional details on setting contextual reactions are provided below in relation to FIG. 6.

At block 510, process 500 can set privacy setting for a pinned avatar. The privacy settings can define who can discover and/or interact with the avatar. In some implementations, the avatar can be "public" meaning it can be discovered by anyone in the area of the avatar. In other cases, the avatar permissions can be set according to social graph relationships (e.g., anyone specified on the social graph as a "friend" of the avatar owner can discover it, or using other relationships such as "family" or "friends of friends"). In some cases, an avatar can be private—accessible only by the avatar owner. In yet further implementations, the avatar privacy setting can be based on user characteristics—e.g., only people with defined characteristics can discover the avatar (e.g., only users can discover the avatar who follow a social media page specified by the avatar owner; who are defined as fans of a particular band or sports team; who have checked-in to a particular restaurant; who are over 16 years old; who have a particular job; or etc.)

At block 512, process 500 can set a persistence for the avatar. The persistence can define how long the avatar will appear at the pinned location before it disappears. For example, a persistence can be set at one week, one day, five hours, etc. In some cases, avatars can have an ongoing persistence such that they do not expire. In some cases, avatar persistence can be event based, e.g., causing an avatar to expire upon a particular context as described herein. For example, an avatar can be set to expire after interacting with 25 users or once it stops raining. In some implementations, persistence can also include a start time/event for when the avatar will begin being discoverable/viewable.

At block 514, process 500 can configure an avatar to provide status updates to an owner of the avatar. In some implementations, an avatar can be configured (via a central coordination system) to provide periodic or event-driven reports to the avatar owner. For example, the reports can indicate what reactions have been triggered, who the avatar has interacted with, how long the avatar has left in its persistence setting, how many people have discovered it, how many social media reactions it has received, etc. For example, every time a user identified as a friend of the avatar owner on a social graph triggers a reaction for the avatar to give a high-five, the avatar owner can be notified.

Figure 6:
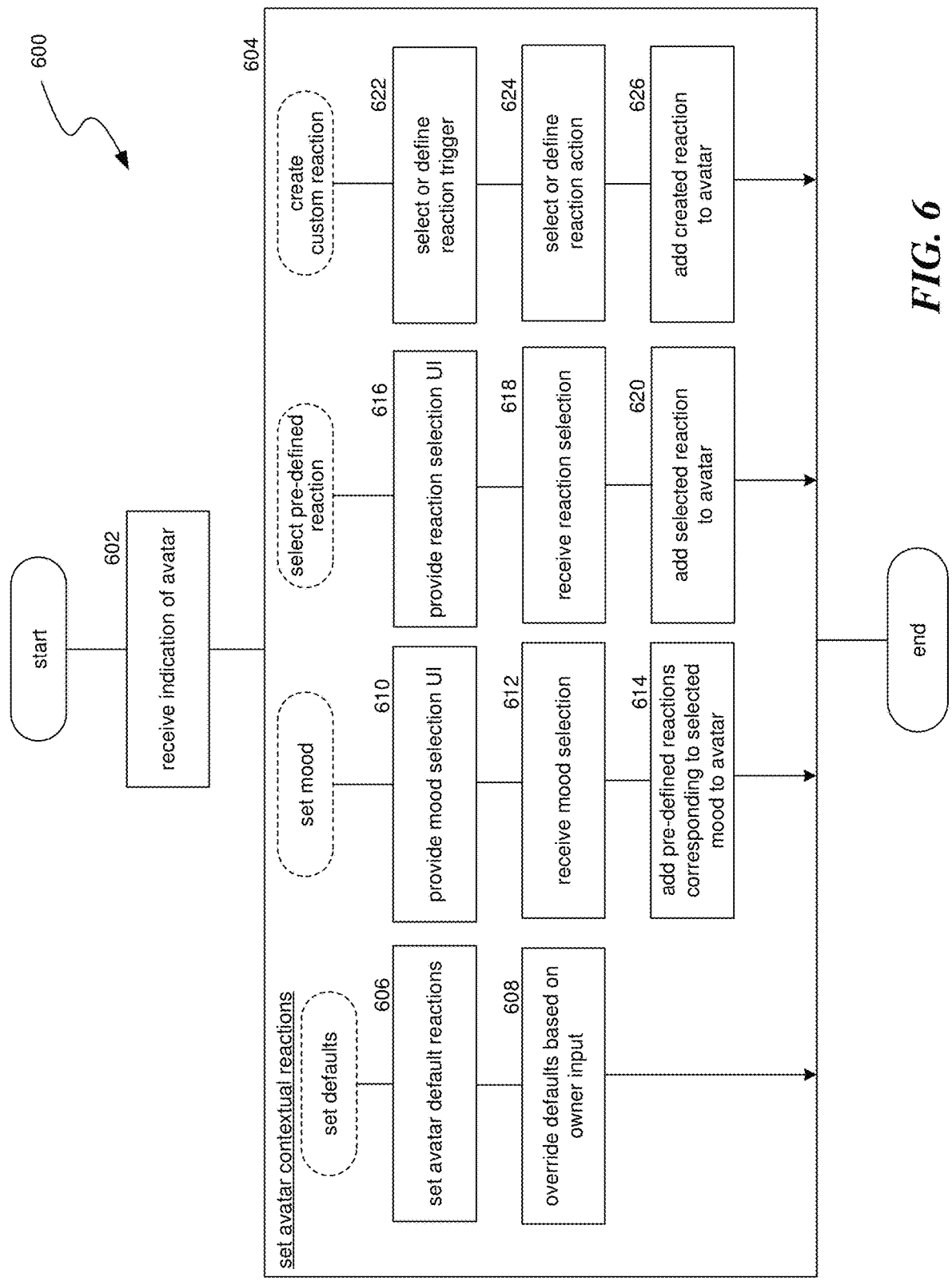
FIG. 6 is a flow diagram illustrating a process used in some implementations of the present technology for configuring contextual reactions of a pinned avatar.

FIG. 6 is a flow diagram illustrating a process 600 used in some implementations of the present technology for configuring contextual reactions of a pinned avatar. In some cases, process 600 can be performed as a sub-process of process 500, e.g., at block 508.

The contextual reactions set for an avatar through process 600, whether set individually or as a group, can each include a trigger and a resulting action. A trigger can be a single event or a conditional statement that triggers the reaction's action when the conditional statement evaluates to true. Thus, a trigger can specify various logical operators, (e.g., AND, OR, XOR, NOT, EQUALS, GTREATER_THAN, LESS_THAN, etc.) between detectable events. For example, the conditional statement could be (friend_user_within_2_meters AND friend_user_age LESS_ THAN 13) OR (number_of_surrounding_users GREATER_THAN 20). This conditional statement will evaluate to true when either A) a user identified as a friend of the avatar owner is within two meters of the avatar and that user is less than 13 year old or B) there are at least 20 people in an area defined around the avatar. The events that can be designated in a trigger can be any event that an XR device can check as having occurred. For example, triggering events can be from sources such as environment data (e.g. weather, time of day, etc.); user statuses (e.g., indications of user emotions, people a user is with, where a user is, etc.); places near the avatar; objects identified around the avatar; other avatars in the area; or similar events related to the avatar owner (e.g., the avatar can be triggered based on what happens to the avatar's owner, such as changing the expression of the avatar to match an emotion indicated by the avatar's owner, even when the avatar's owner is not in the vicinity of the avatar).

The action(s) paired with a trigger to form a reaction can be any modification or animation the avatar can perform, such as a change to the avatar's appearance (from changing accessories to completely transfiguring the avatar); setting a different mood set of contextual reactions (as discussed below) for the avatar; performing an simple animation (an animation performed without regard to the surroundings) or a location aware animation (an animation performed in relation to surrounding such as swinging around a light pole, walking up a slope, or sitting on a bench), etc. Location aware actions can be performed using surface, object, and people detection procedures offered by an XR device. In some cases, an action can be performed in relation to the trigger of the action. For example, the action can be performed relative to and/or with the triggering entity, such as by picking up a virtual object, giving a high-five to a friend that triggered the action, waiving at a person walking by, taking a picture with a fan, etc.

At block 602, process 600 can receive an indication of an avatar to which a contextual reaction will be applied. In some implementations, this can be the avatar being created or updated by process 500.

At block 604, process 600 can set one or more contextual reactions for the indicated avatar. Block 604 includes four sub-processes for setting a default set of one or more contextual reactions (blocks 606 and 608), setting a pre-defined set of contextual reactions for a particular mood (blocks 610-614), selecting individual pre-defined contextual reactions (blocks 616-620); or creating a custom contextual reaction (blocks 622-626). As indicated by the broken lines for the starting block for each sub-process, an avatar owner can cause block 604 to perform any one or more of these sub-processes or can perform the same sub-process multiple times.

At block 606, a default set of reactions can be set for the avatar. In various implementations, this can be a set of reactions the avatar owner has established for all her avatars and/or can be a set of interactions that a system administrator has assigned for all new avatars. At block 608, process can override aspects of the default reactions. This can include excluding certain ones of the default reactions or changing default reaction triggers or actions. For example, a default reaction can be for the avatar to wave when the system recognizes a friend of the avatar owner, however the avatar can change this reaction so that the trigger for waiving is recognizing family instead of friends. In some implementations, a user may not choose to override default reactions, in which case block 608 can be skipped.

At block 610, process 600 can provide a mood selection user interface (UI). For example, the UI can show a variety of "mood" options that each include one or more pre-defined contextual reactions for that mood. Examples of moods include "happy," "quiet," "social," "solemn," etc. As an example, the "happy" mood can include reactions that cause the avatar to dance upon seeing people, give high-fives, have smiling expressions, and have an animated sun shining over its head. The mood selection interface can list the available mood reaction groups, describe the types of reactions in each group, define the individual reactions in a group, and/or provide options for customizing a group.

At block 612, process 600 can receive a mood selection from the avatar owner. At block 614, process 600 can apply the pre-defined reactions from the selected mood to the avatar.

At block 616, process 600 can provide a user interface (UI) listing available pre-defined reactions that can be applied to the avatar. For example, there can be a library of pre-defined reactions created by system administrators, other users, or previously saved by the avatar owner (e.g., using blocks 622-626). At block 618, process 600 can receive a selection of a pre-defined from the avatar owner. At block 620, process 600 can apply the selected pre-defined reaction to the avatar.

At block 622, process 600 can receive a trigger for a custom reaction that a user has created or selected. In some cases, there can be a library of pre-defined triggers the user can select from. In other cases, the user can define a new trigger—e.g., through a scripting interface, by defining the trigger in an XML or other structured language, by executing a trigger definition widget, etc.

At block 624, process 600 can receive one or more actions to pair with the trigger from block 622. In some cases, there can be a library of pre-defined actions the user can select from. In other cases, the user can define a new action—e.g., through a 3D design application (e.g., Unity), a scripting interface, by executing an action definition widget, etc. For example, a user may be able to define movement patterns for an avatar and/or interactions between the avatar and objects as actions.

At block 626, process 600 can create the custom reaction by pairing the trigger from block 622 with the action(s) from block 624 and can add the new reaction to the avatar. In some cases, once a user creates a reaction, the user may be able to share the reaction with other users to add to their avatars or add the reaction to a repository that user or other users can access (e.g., in their versions of block 616).

Process 600 may repeat block 604 one or more times. Following block 604, process 600 can end, e.g., returning to block 508 of FIG. 5.

Figure 7:
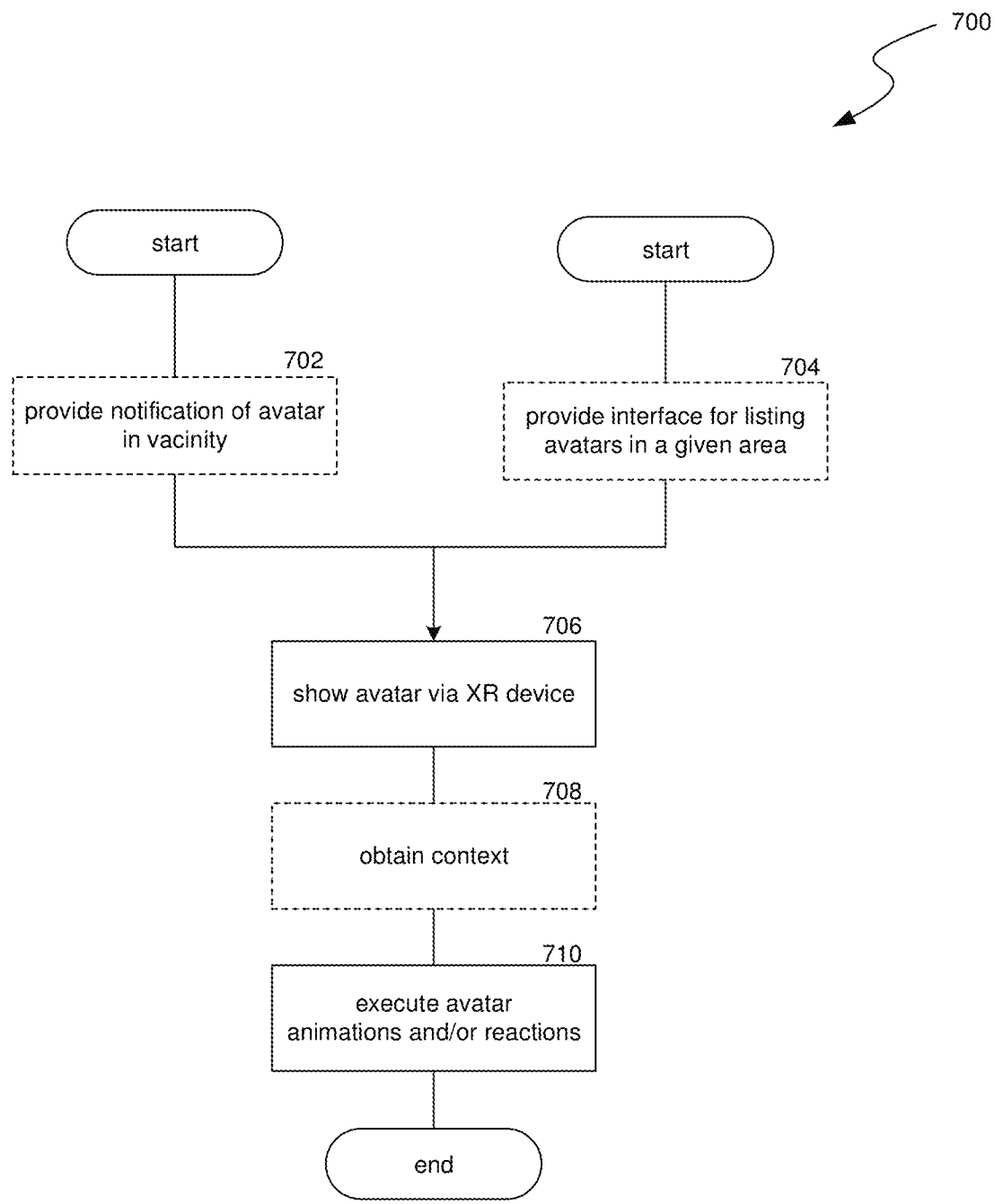
FIG. 7 is a flow diagram illustrating a process used in some implementations of the present technology for viewing and interacting with a pinned avatar.

FIG. 7 is a flow diagram illustrating a process 700 used in some implementations of the present technology for viewing and interacting with a pinned avatar. In some cases, process 700 can be performed on a XR device of a user viewing an avatar, such as a wearable system or a mobile device. In other cases, process 700 can be performed on another computing system of an avatar owner, such as a laptop or desktop. In yet further cases, process 700 can be performed on a server or other computing system of a platform for the interactive avatar system, which can serve content, via process 700, to a computing system of the avatar viewer. In various implementations, process 700 can be initiated at block 702 where a user is notified of a pinned avatar in the vicinity; at block 704 where a user is provided with a map or other indication of pinned avatars in an area; or at block 706 where an avatar viewer discovers an existing pinned avatar in her surroundings. In each case, blocks 702, 704, and/or 706 can be performed in the context of privacy and persistence settings for an avatar, e.g., only providing indications of avatars for which the viewing user has rights to view (see block 510 of FIG. 5) and which have not expired according to the avatar's persistence settings (see block 512 of FIG. 5). As discussed above, while any block can be rearranged or omitted, blocks 702, 704, and 708 are shown in dashed lines to indicate specific implementations where process 700 is performed without at least one of these blocks.

At block 702, process 700 can provide a user with a notification that there is a pinned avatar in the user's vicinity. For example, as a user moves about the world (or a virtual world), the user can be provided a notification that they can discover a nearby avatar, such as by a push notification to a phone, a text or AR notification to a display of an XR device (e.g., a text indication stating where the avatar is, who the avatar owner is, special promotion associated with the avatar, etc., an arrow or other directional indicator to the avatar, a mini-map illustrating the avatar's location, etc.) In some cases, the user can customize when and how the user receives such notifications, e.g., only for avatars pinned by users with a particular relationship to the user on a social graph (e.g., only from friends or others the user follows, etc.); only during certain times of day; or only when the user has been identified as being in an mode to receive pinned avatar notifications.

At block 704, process 700 can provide an interface for a user to discover a map, list, or other display of one or more avatars that have been pinned in a given area. This can be the area the user is currently in or another area. For example, a user can pull up a map on her phone and receive indications of avatars pinned near an indicated location, even if the user is not at that location. In various implementations, the interface can include additional information about the avatar or avatar owner, such as reactions the avatar can perform, special promotions for a user interacting with the avatar, who the avatar owner is, messages or other content assigned to the avatar, etc.

At block 706, process 700 can show an avatar, e.g., via an XR device. Block 706 can be performed following a user receiving a notification of the avatar (at block 702), having located the avatar via a provided interface (at block 704), or simply by viewing the world where an avatar has been pinned (and for which the user has permissions to view). The specifics of the avatar (e.g., its location, reactions, etc.— established by an avatar owner via processes 500 or 600) can be provided via the central platform system controlling the interactive avatar system. In some cases, the XR device can be an AR device, such as a mobile phone or tablet, through which the user views the world with the avatar and other virtual overlays on a video feed of the world. For example, the user can point her phone's camera at areas of the world and see on her screen an avatar pinned to that location. In some cases, the XR device can be an MR device, such as a device with a wearable headset, with a pass-through display where a user can view the world (e.g., directly viewing light reflecting off real-world objects) with avatar and other virtual objects added as additional light projected into the user's eyes (e.g., via waveguides). For example, the user can be wearing mixed reality glasses which can illustrate a pinned avatar over real-world objects when the user looks at a location where there is a pinned avatar. In yet other cases, the XR device can be a VR device, such as a device with a wearable headset that provides a fully immersive computer-generated world, including an avatar and other virtual objects. For example, the user can be viewing a virtual reality recreation of a real-world area where an avatar has been pinned, with the recreation including the pinned avatar.

At block 708, process 700 can obtain a context for triggering one or more avatar reactions. As discussed above, a pinned avatar can be assigned various reactions with triggers specifying when and how an avatar should act. These reactions can be obtained for an avatar a user is viewing (either by providing them to the viewing user's XR device or by gathering data for them on a central system to inform the viewing user's XR device what actions the avatar should perform). Also as discussed above, a context can be the context of an area around the avatar, a context of the avatar owner, and/or a context of the avatar viewer. For example, various camera/sensors on an XR device can provide context as to what is in the area of the viewing user or avatar, other signals or environment data (e.g., weather reports, traffic data, location aware posting from social media users, etc.) can be gathered to determine area context, inputs from the avatar owner (e.g., emotion indicators, natural-language analyses of posts, etc.) can provide avatar owner context, manual triggering events from the avatar owner, etc. can all be gathered where needed to evaluate the triggering expressions for reactions assigned to an avatar.

At block 710, process 710 can execute animations or other actions for triggered reactions of the avatar. As discussed above, avatars can be assigned various actions such as performing an animation, interacting with a user, conferring a data object (e.g., providing a promotional code, activating an accessory, transferring a virtual object), sending a message (e.g., to the avatar owner or another designated recipient), or any other action in response to a trigger evaluating to true. Such triggers can be periodic or a combination of one or more conditions defined in the triggering statement. In some cases, the action of a reaction may be performed in relation to what triggered the reaction (e.g., if a "friend" of the avatar owner triggered the reaction, the action can be performed in relation to that friend—such as by waiving at the friend, playing a game with the friend, sending a data object to the friend, etc.) In some implementations, animations and other actions can be performed in a manner that is consistent with a determined environment of the avatar. For example, an animation that moves the avatar can account for other objects and people, such as by moving around other people and objects (real or virtual), moving according to changes in surface elevations, reacting to weather, etc. In some implementations, each user who views an avatar sees their own version of that avatar—so the same avatar can be triggered by two different users simultaneously and each viewing user can see it waiving at them. In other cases, a single instance of an avatar is shared across viewing users, so if multiple users can see the avatar, a first user may see the avatar waiving at them while a second user would see that avatar waiving at the first user. Blocks 706-710 can repeat as a user continues to view one or more avatars in her environment.

Figure 8:
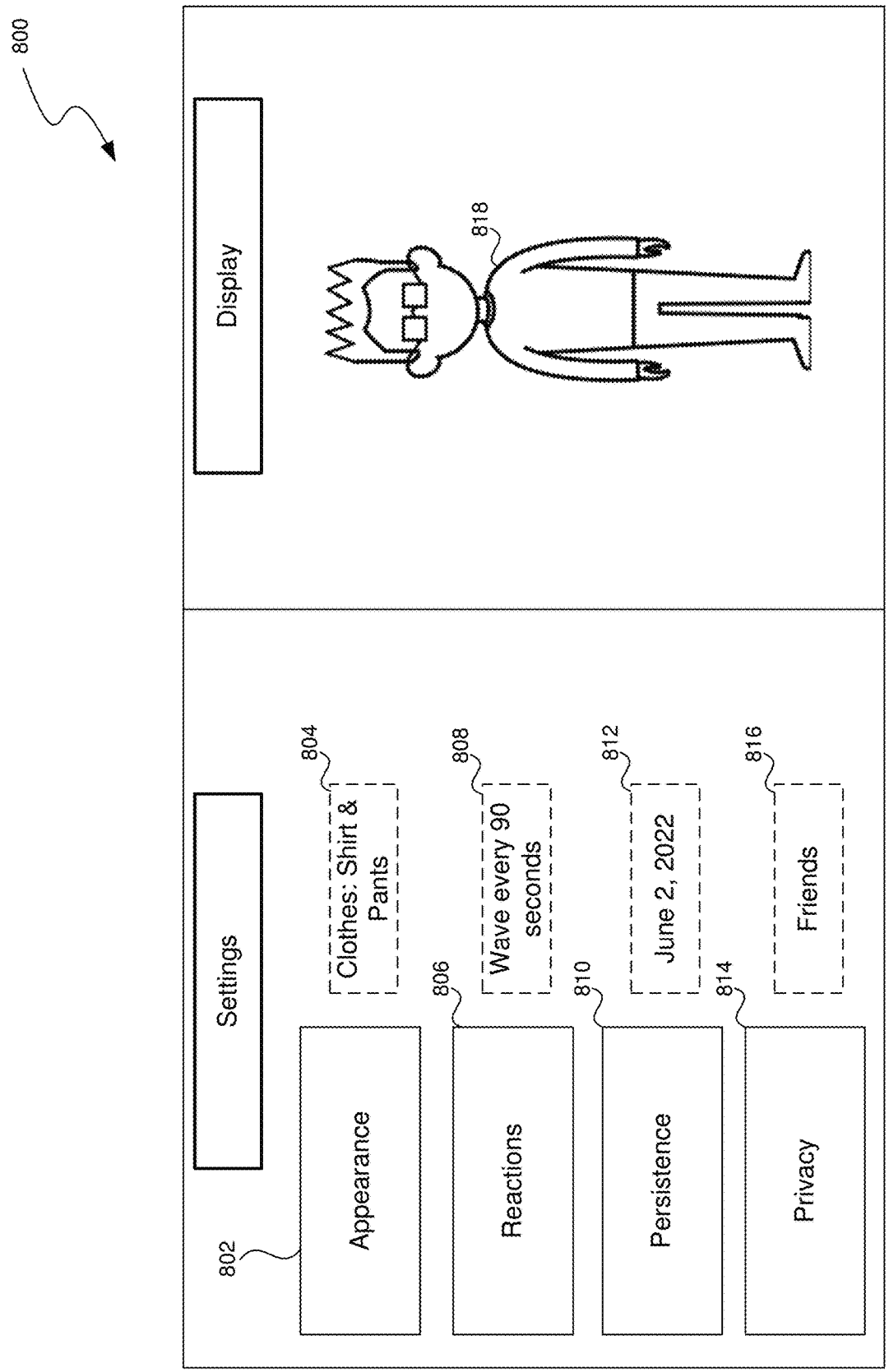
FIG. 8 is a conceptual diagram illustrating an example of configuring an avatar to be pinned at a location.

FIG. 8 is a conceptual diagram illustrating an example 800 of configuring an avatar to be pinned at a location. The avatar configuration interface in example 800 includes options 802 for setting an appearance of an avatar (as previewed by the avatar 818 in the display area), options 806 for setting reactions for the avatar, options 810 for setting how long the avatar will persists at a location once placed, and options 814 for setting who can discover and view the avatar once placed. In example 800, the avatar's appearance has so far been set to have shirt and pants clothing (via selection 804); a reaction that causes the avatar to wave every 90 seconds (via selection 808); a persistence which will cause the avatar to remain where pinned until Jun. 2, 2022 (via selection 812); and be discoverable and viewable by users identified as friends of the avatar's owner (via selection 816). Once created, the avatar owner can pin the avatar to a location, e.g., by viewing the avatar at that location on a passthrough display of an AR device and tapping a control or peeling the avatar 818 out of the display area on an MR device and dropping it at the desired location.

Figure 9:
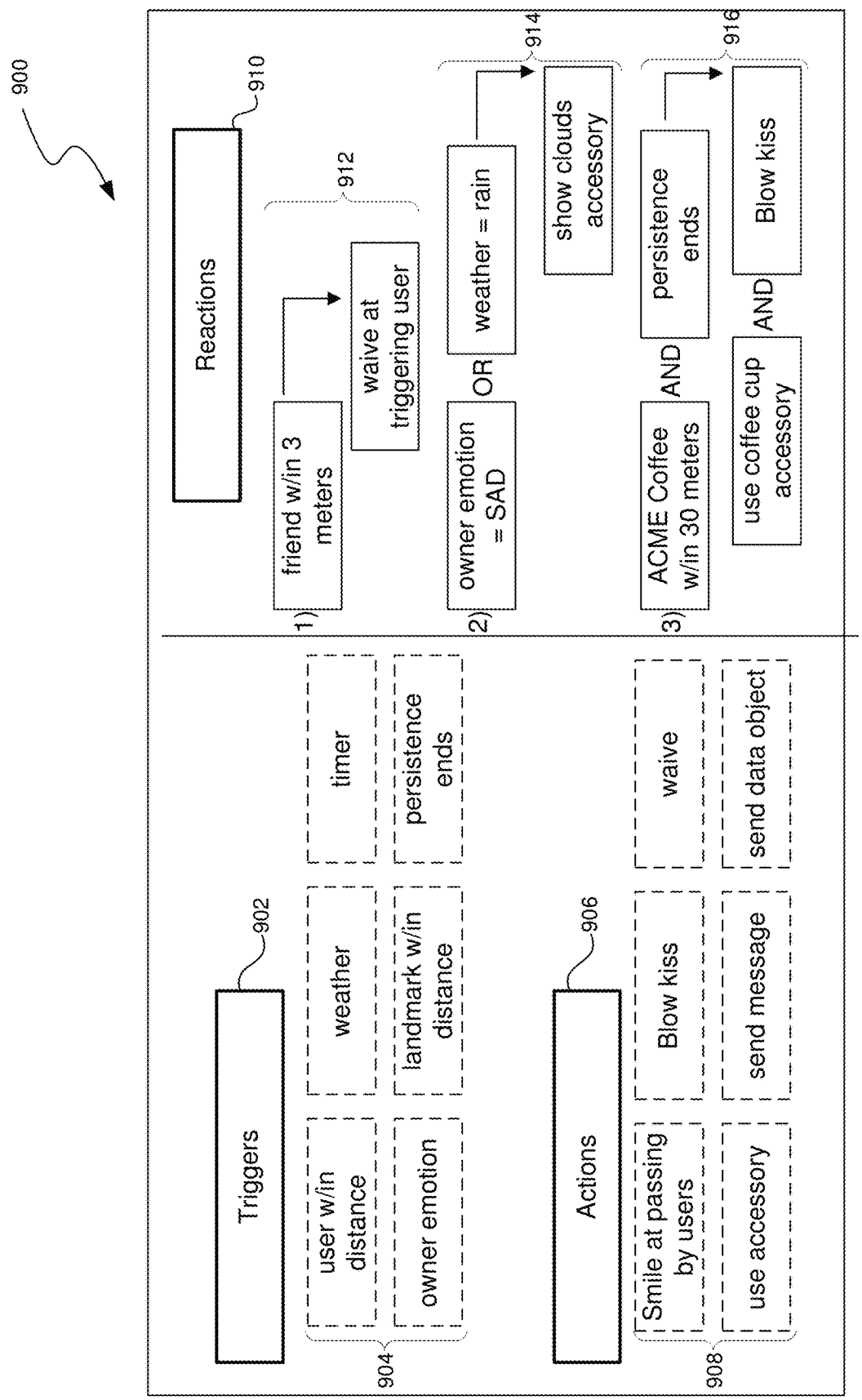
FIG. 9 is a conceptual diagram illustrating an example of creating a custom reaction for an avatar through selection of pre-defined triggers and actions.

FIG. 9 is a conceptual diagram illustrating an example 900 of creating a custom reaction for an avatar through selection of pre-defined triggers and actions. Example 900 includes an interface that provides a set of pre-defined triggers 902 and actions 906 on the left side which a user can drag to the right side of the interface to build reactions 910. As a user drags a triggering condition from the set 904 into a reaction, depending on the reaction, the user can specify trigger parameters. For example, when the user selected the trigger "user w/in distance" trigger for reaction 912, the user set a user type to "friends" and a distance amount to "3 meters," creating the triggering condition "friend w/in 3 meters," indicating that this trigger will evaluate to true when a user who is identified as a friend of the avatar owner is within three meters of where the avatar's location. For reaction 912, this trigger has been paired with a "waive at triggering user" action, causing the avatar to waive at the user who caused the triggering condition to evaluate to true.

Reaction 914, in example 900, has been configured by adding both the "owner emotion" trigger and the "weather" as triggers for the reaction. The user has specified an OR relationship between these, meaning that if either condition evaluates to true, the whole triggering statement is true. The user has specified a "SAD" parameter for the owner emotion trigger and a "rain" parameter for the weather parameters. The user has finally added the "use accessory" action to this reaction and specified the accessory to be a set of clouds. Thus, reaction 914 will occur when either the system determines that the avatar owner has specified a sad emotion or it's raining, which will cause the clouds accessory to appear over the avatar.

Reaction 916, in example 900, has been configured by adding both the "landmark w/in distance" trigger and the "persistence ends" as triggers for the reaction. The user has specified "ACME coffee" landmark and "within 30 meters" parameters for the landmark within distance trigger. The user has specified an AND relationship between the triggers, meaning that the triggering statement only evaluates to true when both the avatar is within 30 meters of an ACME coffee shop and the persistence time set for the avatar has come to an end. The user has added the "use accessory" action, with a coffee cup parameter, and the blow kiss action for this reaction. Thus, reaction 916 will occur when both the system determines there is an ACME coffee shop within 30 meters of where the avatar owner placed the avatar and the persistence time is ending, which will cause the avatar to take out a coffee cup accessory and then blow a kiss to the surrounding users before disappearing.

Figure 10B:
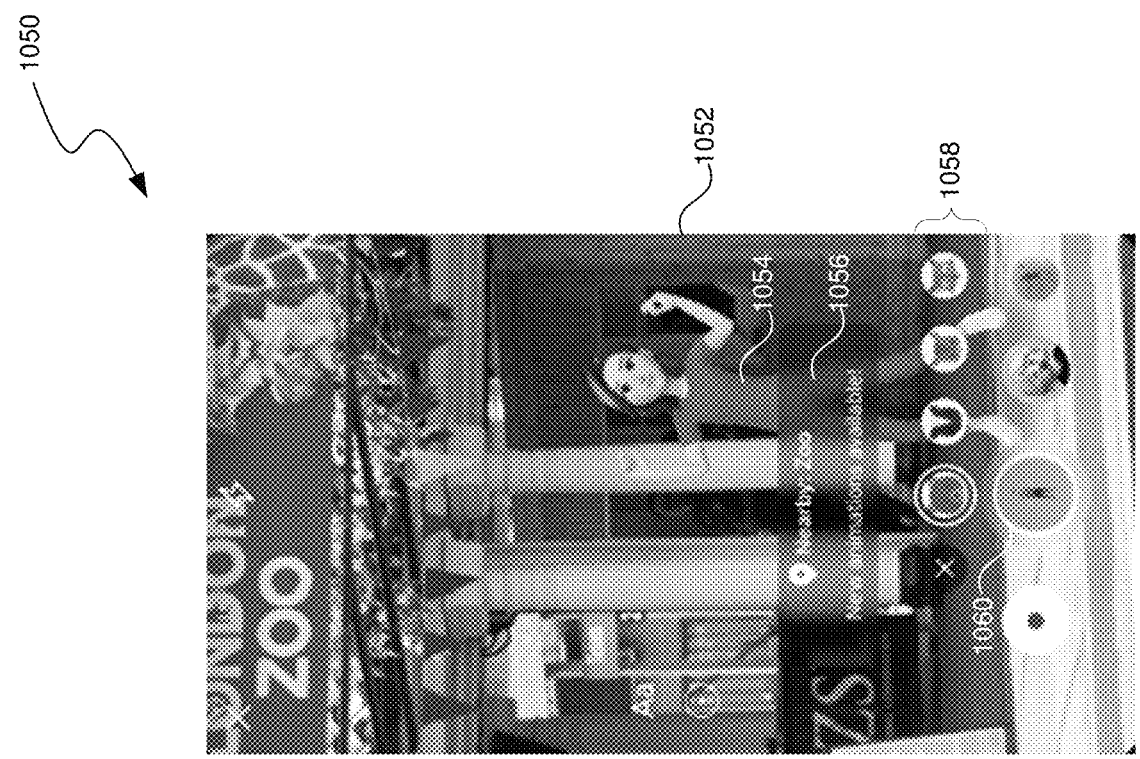
FIG. 10B is a conceptual diagram illustrating an example of viewing a pinned avatar.
Figure 10A:
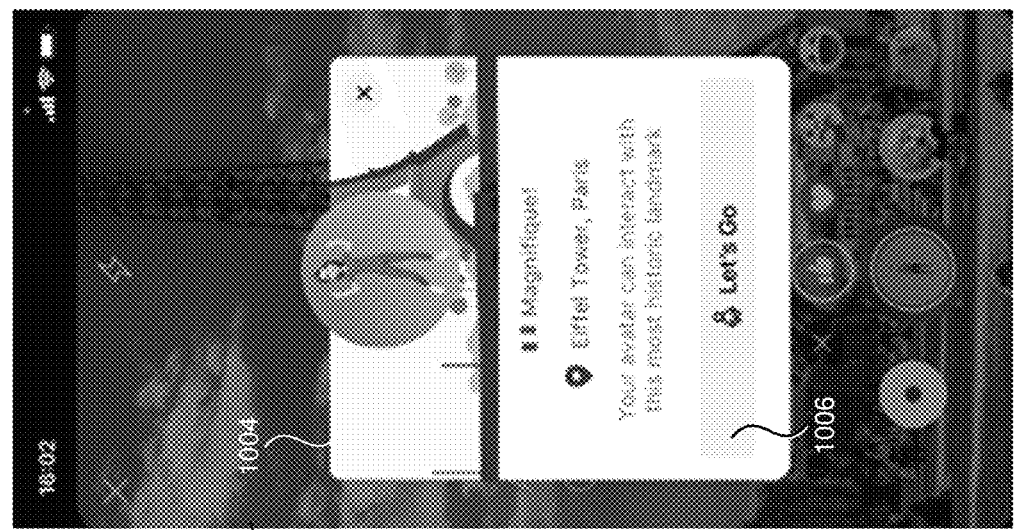
FIG. 10A is a conceptual diagram illustrating an example of pinning an avatar.

FIG. 10A is a conceptual diagram illustrating an example 1000 of pinning an avatar. In example 1000, a user is at the Eiffel Tower in Paris, the area around which he is viewing through a passthrough display on his mobile phone 1002. An interactive avatar system on the user's phone 1002 identifies this as a common location for pinning avatars and suggests, with modal 1004, to pin an avatar at this location. The user begins the process to pin an avatar at this location by selecting control "Check in here" 1006.

FIG. 10B is a conceptual diagram illustrating an example 1050 of viewing a pinned avatar. In example 1050, a user is wearing an MR headset with field of view 1052. In the field of view 1052, the user can see a real world city park, along with pinned avatar 1054 pinned in front of it. By pinning the avatar near a popular restaurant "Burger Dance" (as indicated by notification 1056), the restaurant has provided a number of reactions 1058 with periodic animation actions themed for the restaurant, that the avatar owner can select to apply to her avatar. The avatar owner can also snap a picture of her avatar at that location by activating control 1060.

Reference in this specification to "implementations" (e.g., "some implementations," "various implementations," "one implementation," "an implementation," etc.) means that a particular feature, structure, or characteristic described in connection with the implementation is included in at least one implementation of the disclosure. The appearances of these phrases in various places in the specification are not necessarily all referring to the same implementation, nor are separate or alternative implementations mutually exclusive of other implementations. Moreover, various features are described which may be exhibited by some implementations and not by others. Similarly, various requirements are described which may be requirements for some implementations but not for other implementations.

As used herein, being above a threshold means that a value for an item under comparison is above a specified other value, that an item under comparison is among a certain specified number of items with the largest value, or that an item under comparison has a value within a specified top percentage value. As used herein, being below a threshold means that a value for an item under comparison is below a specified other value, that an item under comparison is among a certain specified number of items with the smallest value, or that an item under comparison has a value within a specified bottom percentage value. As used herein, being within a threshold means that a value for an item under comparison is between two specified other values, that an item under comparison is among a middle-specified number of items, or that an item under comparison has a value within a middle-specified percentage range. Relative terms, such as high or unimportant, when not otherwise defined, can be understood as assigning a value and determining how that value compares to an established threshold. For example, the phrase "selecting a fast connection" can be understood to mean selecting a connection that has a value assigned corresponding to its connection speed that is above a threshold.

As used herein, the word "or" refers to any possible permutation of a set of items. For example, the phrase "A, B, or C" refers to at least one of A, B, C, or any combination thereof, such as any of: A; B; C; A and B; A and C; B and C; A, B, and C; or multiple of any item such as A and A; B, B, and C; A, A, B, C, and C; etc.

Although the subject matter has been described in language specific to structural features and/or methodological acts, it is to be understood that the subject matter defined in the appended claims is not necessarily limited to the specific features or acts described above. Specific embodiments and implementations have been described herein for purposes of illustration, but various modifications can be made without deviating from the scope of the embodiments and implementations. The specific features and acts described above are disclosed as example forms of implementing the claims that follow. Accordingly, the embodiments and implementations are not limited except as by the appended claims.

Any patents, patent applications, and other references noted above are incorporated herein by reference. Aspects can be modified, if necessary, to employ the systems, functions, and concepts of the various references described above to provide yet further implementations. If statements or subject matter in a document incorporated by reference conflicts with statements or subject matter of this application, then this application shall control.

We claim:

1. A method for interacting with a pinned interactive avatar, pinned as world-locked artificial reality content, the method comprising:
receiving, at an XR device, the pinned interactive avatar in response to A) an identification that the XR device is within a first threshold distance of a location at which the pinned interactive avatar was pinned or B) an indication from the XR device specifying an interaction for a location within a second threshold distance of the location at which the pinned interactive avatar was pinned,
wherein the pinned interactive avatar is associated with one or more reactions that each include one or more triggers, with each trigger corresponding to one or more actions, wherein the one or more reactions control, at least in part, how the pinned interactive avatar acts, when viewed via the XR device;
displaying, via the XR device, a version of the pinned interactive avatar;
obtaining a context of the XR device; and
matching the context with aspects of the one or more triggers to identify one or more activated triggers and, in response to identifying the one or more activated triggers, causing the version of the pinned interactive avatar to perform the one or more actions corresponding to each one of the one or more activated triggers.

2. The method of claim 1, wherein the pinned interactive avatar is associated with a notification provided to a user of the XR device, via a mobile device other than the XR device and in response to either A) the identification that the XR device is within the first threshold distance of the location at which the pinned interactive avatar was pinned or B) an identification that the mobile device is within the first threshold distance of the location at which the pinned interactive avatar was pinned.

3. The method of claim 1,
wherein the receiving the pinned interactive avatar is in response to the indication from the XR device specifying the interaction for the location within the second threshold distance of the location at which the pinned interactive avatar was pinned; and
the interaction for the location within the second threshold distance is based on a user selection in a map user interface.

4. The method of claim 1 further comprising causing a notification to be provided, to a remote system that originated the pinned interactive avatar, indicating that the pinned interactive avatar has been viewed.

5. The method of claim 4, wherein the notification indicates:
what actions of the pinned interactive avatar have been triggered; and/or
who has interacted with the pinned interactive avatar.

6. The method of claim 1, wherein the receiving the pinned interactive avatar is further response to a determination that a current time is within a specified time for the pinned interactive avatar to be viewed at the pinned location.

7. The method of claim 1, wherein the receiving the pinned interactive avatar is further response to a determination that a user of the XR device has a specified relationship, in an online platform, with an owner of the pinned interactive avatar.

8. The method of claim 1, wherein the pinned interactive avatar has a set of viewing permissions and the receiving the pinned interactive avatar is further in response to a determination that a current user of the XR device satisfies the viewing permissions.

9. The method of claim 1, wherein the displaying the version of the pinned interactive avatar includes one or more of: a text indication stating where the version of the pinned interactive avatar is, an indication of who an owner of the pinned interactive avatar is, a promotion virtual object associated with the pinned interactive avatar, an arrow or other directional indicator to the version of the pinned interactive avatar, or any combination thereof.

10. The method of claim 1, wherein the XR device is an augmented reality device through which a user of the XR device views the world with the version of the pinned interactive avatar as an overlay on a video feed of the real world or the XR device a mixed reality device with a pass-through display where the user of the XR device views the real world with the version of the pinned interactive avatar added as additional light projected to the user.

11. The method of claim 1, wherein the matching of the context of the XR device to the one or more activated triggers includes a determination that a user of the XR device has a specified relationship, on an online platform, with an owner of the pinned interactive avatar.

12. The method of claim 1, wherein the matching of the context of the XR device to the one or more activated triggers includes one or more of:
determining that current weather data matches a trigger condition;
determining that traffic data matches a trigger condition; or
determining that a social media posting, associated with a geographical location, matches a trigger condition.

13. The method of claim 1, wherein the matching of the context of the XR device to the one or more activated triggers includes matching a determined emotion indicator for a user of the XR device with a trigger condition.

14. A computer-readable storage medium storing instructions that, when executed by a computing system, cause the computing system to perform a process for interacting with a pinned interactive avatar, pinned as world-locked artificial reality content, the process comprising:
receiving, at an XR device, the pinned interactive avatar in response to A) an identification that the XR device is within a first threshold distance of a location at which the pinned interactive avatar was pinned or B) an indication from the XR device specifying an interaction for a location within a second threshold distance of the location at which the pinned interactive avatar was pinned,
wherein the pinned interactive avatar is associated with one or more reactions that each include one or more triggers, with each trigger corresponding to one or more actions, wherein the one or more reactions control, at least in part, how the pinned interactive avatar acts, when viewed via the XR device;

displaying, via the XR device, a version of the pinned interactive avatar; and identifying one or more activated triggers and, in response to identifying the one or more activated triggers, causing the version of the pinned interactive avatar to perform the one or more actions corresponding to each one of the one or more activated triggers.

15. The computer-readable medium of claim 14, wherein the process further comprises obtaining a context of the XR device; and wherein the identifying the one or more activated triggers comprises matching the context with aspects of the one or more triggers.

16. The computer-readable medium of claim 14, wherein an image, captured of a user of the XR device at the location where the pinned interactive avatar is pinned, is automatically modified to include a representation of the version of the pinned interactive avatar with the user of the XR device.

17. The computer-readable medium of claim 14, wherein the performed one or more actions, associated with the one or more activated triggers, include interacting with a user of the XR device and/or conferring a data object to the XR device.

18. The computer-readable medium of claim 14, wherein the XR device is a first XR device, the version of the pinned interactive avatar is a first version of the pinned interactive avatar, and the one or more actions performed by the first version of the pinned interactive avatar are one or more first actions;

wherein a second XR device has received the pinned interactive avatar and displayed a second version of the pinned interactive avatar; and wherein the one or more first actions performed by the first interactive avatar are different from one or more second actions performed by the second version of the interactive avatar.

19. A computing system for interacting with a pinned interactive avatar, pinned as world-locked artificial reality content, the computing system comprising:

one or more processors; and one or more memories storing instructions that, when executed by the one or more processors, cause the computing system to perform a process comprising:

receiving, at an XR device, the pinned interactive avatar in response to A) an identification that the XR device is within a first threshold distance of a location at which the pinned interactive avatar was pinned or B) an indication from the XR device specifying an interaction for a location within a second threshold distance of the location at which the pinned interactive avatar was pinned, wherein the pinned interactive avatar is associated with one or more reactions that each include one or more triggers, with each trigger corresponding to one or more actions, wherein the one or more reactions control, at least in part, how the pinned interactive avatar acts, when viewed via the XR device;

displaying, via the XR device, a version of the pinned interactive avatar; and identifying one or more activated triggers and, in response to identifying the one or more activated triggers, causing the version of the pinned interactive avatar to perform the one or more actions corresponding to each of the one or more activated triggers.

20. The computing system of claim 19, wherein the process further comprises obtaining a context of the XR device; and wherein the identifying the one or more activated triggers comprises matching the context with aspects of the one or more triggers.

* * * * *